US009786905B2

(12) United States Patent
Holme et al.

(10) Patent No.: US 9,786,905 B2
(45) Date of Patent: Oct. 10, 2017

(54) IRON, FLUORINE, SULFUR COMPOUNDS FOR BATTERY CELL CATHODES

(71) Applicant: QuantumScape Corporation, San Jose, CA (US)

(72) Inventors: Timothy P. Holme, Mountain View, CA (US); Joseph Han, Redwood City, CA (US); Weston Arthur Hermann, Palo Alto, CA (US); Rainer J. Fasching, Mill Valley, CA (US); Bradley O. Stimson, Monte Sereno, CA (US); Cheng Chieh Chao, Santa Clara, CA (US)

(73) Assignee: QuantumScape Corporation, San Jose, CA (US)

( * ) Notice: Subject to any disclaimer, the term of this patent is extended or adjusted under 35 U.S.C. 154(b) by 435 days.

(21) Appl. No.: 14/207,493

(22) Filed: Mar. 12, 2014

(65) Prior Publication Data

US 2014/0272564 A1     Sep. 18, 2014

Related U.S. Application Data

(60) Provisional application No. 61/778,455, filed on Mar. 13, 2013.

(51) Int. Cl.
*H01M 4/36*     (2006.01)
*H01M 4/04*     (2006.01)
(Continued)

(52) U.S. Cl.
CPC ......... *H01M 4/364* (2013.01); *H01M 4/0404* (2013.01); *H01M 4/136* (2013.01);
(Continued)

(58) Field of Classification Search
CPC ...... H01M 4/364; H01M 4/483; H01M 4/661; H01M 4/136; H01M 4/1397; H01M 4/582;
(Continued)

(56) References Cited

U.S. PATENT DOCUMENTS 6,680,145 B2   1/2004   Obrovac
6,982,132 B1   1/2006   Goldner et al.
(Continued)

FOREIGN PATENT DOCUMENTS

EP    20030788901 B1   3/2010
JP       2009-016234   1/2009
WO    WO 2012/176907   12/2012

OTHER PUBLICATIONS

Wiaderek et al. J. Am. Chem. Soc. 2013, 135, 4070-4078.*
(Continued)

*Primary Examiner* — Ula C Ruddock
*Assistant Examiner* — Lisa S Park
(74) *Attorney, Agent, or Firm* — Squire Patton Boggs (US) LLP

(57) ABSTRACT

Provided herein are energy storage device cathodes with high capacity electrochemically active material including compounds that include iron, fluorine, sulfur, and optionally oxygen. Batteries with active materials including a compound of the formula $FeF_aS_bO_c$ exhibit high capacity, high specific energy, high average discharge voltage, and low hysteresis, even when discharged at high rates. Iron, fluorine, and sulfur-containing compounds may be ionically and electronically conductive.

14 Claims, 14 Drawing Sheets

(51) Int. Cl.
| | |
|---|---|
| H01M 4/1391 | (2010.01) |
| H01M 4/136 | (2010.01) |
| H01M 4/1397 | (2010.01) |
| H01M 4/48 | (2010.01) |
| H01M 4/52 | (2010.01) |
| H01M 4/58 | (2010.01) |
| H01M 4/66 | (2006.01) |
| H01M 4/02 | (2006.01) |

(52) U.S. Cl.
CPC ....... *H01M 4/1391* (2013.01); *H01M 4/1397* (2013.01); *H01M 4/483* (2013.01); *H01M 4/523* (2013.01); *H01M 4/582* (2013.01); *H01M 4/5815* (2013.01); *H01M 4/661* (2013.01); *H01M 2004/021* (2013.01)

(58) Field of Classification Search
CPC .. H01M 4/523; H01M 4/5815; H01M 4/0404; H01M 4/1391; H01M 2004/021
See application file for complete search history.

(56) References Cited

U.S. PATENT DOCUMENTS

| | | | |
|---|---|---|---|
| 7,371,338 | B2 | 5/2008 | Amatucci |
| 7,625,671 | B2 | 12/2009 | Amatucci |
| 7,947,392 | B2 | 5/2011 | Amatucci et al. |
| 8,039,149 | B2 | 10/2011 | Amatucci et al. |
| 8,518,604 | B2 | 8/2013 | Amatucci et al. |
| 8,623,549 | B2 | 1/2014 | Pereira et al. |
| 2003/0170550 | A1* | 9/2003 | Ugawa .................. H01M 4/485 429/331 |
| 2006/0019163 | A1 | 1/2006 | Amatucci |
| 2008/0199772 | A1 | 8/2008 | Amatucci |
| 2011/0065001 | A1 | 3/2011 | Pereira |
| 2013/0048924 | A1 | 2/2013 | Amatucci |

OTHER PUBLICATIONS

Patnaik, P., "Handbook of Inorganic Chemicals," 2003, McGraw-Hill, NY, NY, pp. 410-413, 428-429, 486-491, 500, 507-508.
International Search Report and Written Opinion mailed Jun. 23, 2014 in PCT/US14/24115, 11 pages.
"Cathode performance and voltage estimation of metal trihalides", by Hajime Arai, Shigeto Okada, Yoji Sakurai, Jun-ichi Yamaki, issued on "Journal of Power Sources 68 (1997)".
"Characterization and cathode performance of Li 1 -x,Ni 1 +X O2 prepared with the excess lithium method", by H. Arai, S. Okada, H. Ohtsuka, M. Ichimura, J. Yamaki, issue on "Solid State Ionics 80 (1995)".
"High-Capacity Reversible Metal Fluoride Conversion Materials as Rechargeable Positive Electrodes for Li Batteries", by F. Badway, F. Cosandey, N. Pereira, and G. G. Amatucci, issued on "Journal of the Electrochemical Society".
"Electrolyte development for improved cycling performance of bismuth fluoride nanocomposite positive electrodes", by Andrew J. Gmitter, John Gural, Glenn G. Amatucci, issued on "Journal of Power Sources".
"Investigation of the Lithiation and Delithiation Conversion Mechanisms of Bismuth Fluoride Nanocomposites", by M. Bervas, A. N. Mansour, W.-S. Yoon, J. F. Al-Sharab, F. Badway, F. Cosandey, L. C. Klein and G. G. Amatucci, issue on "Journal of the Electrochemical Society".
"Optical Properties of Chemical Bath Deposited Bismuth Fluoride (Bif3) Thin Films", by Ezema F. I. and M. N. Nnabuchi, issued on "Discov. Innov., 2007; 19 (1)".
"First-principles study of iron oxyfluorides and lithiation of FeOF", by Vincent L. Chevrier, Geoffroy Hautier, Shyue Ping Ong, Robert E. Doe, and Gerbrand Ceder, issued on "Physical Review B 87, 094118 (2013)".

"CFx Derived Carbon—FeF 2 Nanocomposites for Reversible Lithium Storage", by M. Anji Reddy , Ben Breitung , Venkata Sai Kiran Chakravadhanula , Clemens Wall, Michael Engel , Christian Kübel , Annie K. Powell , Horst Hahn , and Maximilian Fichtner, issued on "Advanced Energy Materials".
"A Study of Cobalt and Manganese Fluorides as Cathode Materials for Rechargeable Lithium Cells", by Wishvender K. Behl and Jeffrey A. Read, issued on "ECS Transactions, 41 (41) 97-106 (2012)".
"First principles study on the structural, magnetic and electronic properties of Co-doped FeF3", by Zhenhua Yang, Yong Pei, Xianyou Wang, Li Liu, Xuping Su, issued on "Computational and Theoretical Chemistry 980 (2012) 44-48".
"Electrochemical Reaction of Lithium with Cobalt Fluoride Thin Film Electrode", by Zheng-Wen Fu, Chi-Lin Li, Wen-Yuan Liu, Jun Ma, Ying Wang, and Qi-Zong Qin, issued on "Journal of the Electrochemical Society, 152 (2) E50-E55 (2005)".
"Conversion Reaction of FeF2 Thin Films upon Exposure to Atomic Lithium", by Sylvie Rangan, Ryan Thorpe, Robert Allen Bartynski, Mahsa Sina, Frederic Cosandey, Ozgur Celik, and Daniel D. T. Mastrogiovanni, issued on "The Journal of Physical Chemistry C".
"Multilayered Cobalt Oxide Platelets for Negative Electrode Material of a Lithium-Ion Battery", by Wenli Yao, Jun Yang, Jiulin Wang, and Yanna Nuli, issued on "Journal of the Electrochemical Society, 155 (12) A903-A908 (2008)".
"Structure and Electrochemistry of Copper Fluoride Nanocomposites Utilizing Mixed Conducting Matrices", by F. Badway, A. N. Mansour, N. Pereira, J. F. Al-Sharab, F. Cosandey, Plitz, and G. G. Amatucci, issued on "Chem. Mater. 2007, 19, 4129-4141".
"In situ X-ray absorption spectroscopic investigation of the electrochemical conversion reactions of CuF2—MoO3 nanocomposite", by A.N. Mansour, F.Badway, W.-S.Yoon, K.Y. Chung, G.G.Amatucci, issued on "Journal of Solid State Chemistry 183 (2010) 3029-3038".
"The investigation on electrochemical reaction mechanism of CuF2 thin film with lithium", by Yan-Hua Cuia, Ming-Zhe Xue, Yong-Ning Zhou, Shu-Ming Peng, Xiao-Lin Wang, Zheng-Wen Fu, issued on "Electrochimica Acta 56 (2011) 2328-2335".
"Conversion Reaction Mechanisms in Lithium Ion Batteries: Study of the Binary Metal Fluoride Electrodes", by Feng Wang, Rosa Robert, Natasha A. Chernova, Nathalie Pereira, Fredrick Omenya, Fadwa Badway,Xiao Hua, Michael Ruotolo, Ruigang Zhang, Lijun Wu, Vyacheslav Volkov, Dong Su, Baris Key, M. Stanley Whittingham, Clare P. Grey, Glenn G. Amatucci, Yimei Zhu, and Jason Graetz, issued on "Journal of the American Chemical Society".
"Investigation of the Conversion Reaction Mechanisms for Binary Copper(II) Compounds by Solid-State NMR Spectroscopy and X-ray Diffraction", by Naoko Yamakawa, Meng Jiang, and Clare P. Grey, issued on "Chem. Mater. 2009, 21, 3162-3176".
"Beyond Intercalation-Based Li-Ion Batteries: The State of the Art and Challenges of Electrode Materials Reacting Through Conversion Reactions", by Jordi Cabana , Laure Monconduit , Dominique Larcher , and M. Rosa Palacín, issued on "Advanced Energy Materials".
"Ionic and electronic transport in metal fluoride conversion electrodes", by Feng Wang, Nathalie Pereira, Glenn Amatucci, Hui-Chia Yu, Anton Van der Ven, Katsuyo Thornton, Yimei Zhu and Jason Graetz, issued on "222nd Meeting Electrochemical Society".
"Batteries based on fluoride shuttle", by M. Anji Reddy and M. Fichtner, issued on "Journal of Materials Chemistry".
"Synthesis and characterization of in situ Fe2O3-coated FeF3 cathode materials for rechargeable lithium batteries", by Wei Zhang, Lin Ma, Hongjun Yue and Yong Yang, issued on "Journal of Materials Chemistry".
"Effect of Particle Size on Lithium Intercalation into a-Fe2O3", by D. Larcher, C. Masquelier, D. Bonnin, Y. Chabre, V. Masson, J.-B. Leriche, and J.-M. Tarascon, issued on "Journal of the Electrochemical Society, 150 (1) A133-A139 (2003)".
"Electronic Structure and Chemical Composition of Candidate Conversion Material Iron Oxifluoride", by Sylvie Rangana, Ryan Thorpea, Robert A. Bartynskia, Ozgur Celikb, Nathalie Pereirac and Glenn Amatucci, issued on "220th ECS Meeting".

(56) References Cited

OTHER PUBLICATIONS

"Tracking lithium transport and electrochemical reactions in nanoparticles", by Feng Wang, Hui-Chia Yu, Min-Hua Chen, Lijun Wu, Nathalie Pereira, Katsuyo Thornton, Anton Van der Ven, Yimei Zhu, Glenn G. Amatucci & Jason Graetz, issued on "Nature Communications".

"Three-dimensionally ordered macroporous FeF3 and its in situ homogenous polymerization coating for high energy and power density lithium ion batteries", by De-long Ma, Zhan-yi Cao, Heng-guo Wang, Xiao-lei Huang, Li-min Wang and Xin-bo Zhang, issued on "Energy & Environmental Science".

"Fabrication of FeF3 Nanofl owers on CNT Branches and Their Application to High Power Lithium Rechargeable Batteries", by Sung-Wook Kim, Dong-Hwa Seo, Hyeokjo Gwon , Jongsoon Kim, and Kisuk Kang, issued on "Advanced Materials".

"Excellent Cycle Performance of Co-doped FeF3/C nanocomposite Cathode material for Lithium-Ion Batteries", by Li Liu, Meng Zhou, Lanhua Yi, Haipeng Guo, Jinli Tan, Hongbo Shu, Xiukang Yang, Zhenhua Yang, Xianyou Wang, issued on "Journal of Materials Chemistry".

"Advanced FeF3 Cathode Enabled Lithium-ion Battery", by Za Johnson, Stephen Cordova and G. G. Amatucci, issued on "SAE International".

"Structural and Electronic Properties of Li-Ion Battery Cathode Material FeF3", by R. F. Li, S. Q. Wu, Y. Yang, and Z. Z. Zhu, issued on "J. Phys. Chem. C 2010, 114, 16813-16817".

"High-Capacity Lithium-Ion Battery Conversion Cathodes Based on Iron Fluoride Nanowires and Insights into the Conversion Mechanism", by Linsen Li, Fei Meng, and Song Jin, issued on "Nano Letters".

"Thermodynamics and Kinetics of the Li/FeF3 Reaction by Electrochemical Analysis", Ping Liu, John J. Vajo, John S. Wang, Wen Li, and Jun Liu, issued on "The Journal of Physical Chemistry C".

"A ferrocene-based carbon-iron lithium fluoride nanocomposite as a stable electrode material in lithium batteries", by Raju Prakash, Ajay Kumar Mishra, Arne Roth, Christian Kubel, Torsten Scherer, Mohammad Ghafari, Horst Hahn and Maximilian Fichtner, issued on "Journal of Materials Chemistry".

"Iron Oxyfluorides as High Capacity Cathode Materials for Lithium Batteries", by N. Pereira, z F. Badway, M. Wartelsky, S. Gunn, and G. G. Amatucci, issued on "Journal of the Electrochemical Society, 156 (6) A407-A416 (2009)".

"Chemical Compatibility of Structural Materials with Liquid Li and Sn—Li", by S. Sharafat and N. M. Ghoniem, issued on APEX Meeting.

"Thermodynamic analysis on energy densities of batteries", by Chen-Xi Zu, Hong Li, issued on "Energy & Environmental Science".

"Effect of Vertically Structured Porosity on Electrochemical Performance of FeF2 Films for Lithium Batteries", by Matthew F. Parkinson, Jonathan K. Ko, Anna Halajko , Sheel Sanghvi, and Glenn G. Amatucci.

"Low-Temperature Ionic-Liquid-Based Synthesis of Nanostructured Iron-Based Fluoride Cathodes for Lithium Batteries", by Chilin Li , Lin Gu , Susumu Tsukimoto , Peter A. van Aken , and Joachim Maier, issued on "Advanced Energy Materials".

"Reversible Three-Electron Redox Behaviors of FeF3 Nanocrystals as High-Capacity Cathode-Active Materials for Li-Ion Batteries", by Ting Li, Lei Li, Yu L. Cao, Xin P. Ai, and Han X. Yang, issued on "J. Phys. Chem. C 2010, 114, 3190-3195".

"Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", by Chilin Li, Lin Gu, Jianwei Tong, and Joachim Maier, issued on "ACS NANO".

"Direct synthesis of Cryolite type Li3FeF6 and its characterization as positive electrode in Li cell", by Gocheva, Irina D; Kamimura, Yuichi; Doi, Takayuki; Okada, Shigeto; Yamaki, Juna'ichi; Nishida, Tetsuaki, issued on "Engineering sciences reports, Kyushu University ∥ 31(1) ∥ p.7-11".

"Structural Studies of Iron Hexafluorides: TNFRARED Spectra of M3FeF6 (M=Li, Na, K, Rb, Cs, Ag, Tl", by Sylvia Shearer-Turrell, Alain Tressaud and Josik Portier, issued on "Journal of Molecular Structure".

"Les Hexafluoferrites MzFeF6 (M=Li, Na, K, Rb, Cs, Ag, Tl, NH4): Etude Radiocristallographique, Spectroscopique Et Magnetique", by Alain Tressaud, Josik Portier, Sylvia Shearer-Turrell, Jean-Louis Dupin et Paul Hagenmuller, issued on "J.inorg. nucl. Chem.,1970, vol. 32,pp. 2179 to 2186".

"Formation of lithium fluoride/metal nanocomposites for energy storage through solid state reduction of metal fluorides", by G.G. Amatucci, N. Pereira 1, F. Badway, M. Sina, F. Cosandey, M. Ruotolo, C. Cao, issued on "Journal of Fluorine Chemistry".

"Combinatorially Prepared [LiF]1-xFex Nano composites for Positive Electrode Materials in Li-Ion Batteries", by Peng Liao, Bretton L. MacDonald, R. A. Dunlap, † ‡ and J. R. Dahn, issued on "*Chem. Mater.* 2008, 20, 454-461".

"First Principles Study of the Li—Bi—F Phase Diagram and Bismuth Fluoride Conversion Reactions with Lithium" by Robert E. Doe, Kristin A. Persson, Geoffroy Hautier, and Gerbrand Ceder, issued on "Electrochemical and Solid-State Letters, 12 (7) A125-A128 (2009)".

"Nano-sizedtransition-metaloxidesas negative-electrode materials for lithium-ion batteries", by P. Poizot, S. Laruelle, S. Grugeon, L. Dupont & J-M. Tarascon, issued on "Nature |vol. 407 | Sep. 28, 2000".

"First-Principles Investigation of the Li—Fe—F Phase Diagram and Equilibrium and Nonequilibrium Conversion Reactions of Iron Fluorides with Lithium", by Robert E. Doe, Kristin A. Persson, Y. Shirley Meng, and Gerbrand Ceder, issued on "Chem. Mater. 2008, 20, 5274-5283".

"Atomistic Insights into the Conversion Reaction in Iron Fluoride: A Dynamically Adaptive Force Field Approach", by Ying Ma and Stephen H. Garofalini, issued on "Journal of the American Chemical Society".

"Cathode properties of metal trifluorides in Li and Na secondary batteries", by Manabu Nishijima, Irina D. Gocheva, Shigeto Okada, Takayuki Doi, Jun-ichi Yamaki, Tetsuaki Nishida, issued on "Journal of Power Sources 190 (2009) 558-562".

"A Mesoporous Iron-Based Fluoride Cathode of Tunnel Structure for Rechargeable Lithium Batteries", by Chilin Li , Lin Gu , Jianwei Tong , Susumu Tsukimoto , and Joachim Maier, issued on "Adv. Funct. Mater. 2011, 21, 1391-1397".

"Lithium nickel oxyfluoride (Li1-zNi1+zFyO2-y) and lithium magnesium nickel oxide (Li1-z(MgxNi1-x)1+z O2) cathodes for lithium rechargeable batteries", by A.R. Naghash, Jim Y. Lee, issued on "Electrochimica Acta 46 (2001) 941-951".

"Conversion mechanism of nickel fluoride and NiO-doped nickel fluoride in Li ion batteries", by Dae Hoe Leea, Kyler J. Carroll, Scott Calvin, Sungho Jin, Ying Shirley Meng, issued on "Electrochimica Acta 59 (2012) 213-221".

"Nanostructured nickel fluoride thin film as a new Li storage material", by Hua Zhang, Yong-Ning Zhou, Qian Sun, Zheng-Wen Fu, issued on "Solid State Sciences 10 (2008) 1166-1172".

"Electrochemical behaviour of low temperature grown iron fluoride thin films", by Y. Makimura, A. Rougier, L. Laffont, M. Womes, J.-C. Jumas, J.-B. Leriche, J.-M. Tarascon, issued on "Electrochemistry Communications 8 (2006) 1769-1774".

"Pulsed laser deposited iron fluoride thin films for lithium-ion batteries", by Yoshinari Makimura, Aline Rougier, Jean-Marie Tarascon, issued on "Applied Surface Science 252 (2006) 4587-4592".

"Structure and Electrochemistry of Carbon-Metal Fluoride Nanocomposites Fabricated by Solid-State Redox Conversion Reaction", by I. Plitz, F. Badway, J. Al-Sharab, A. DuPasquier, F. Cosandey, and G. G. Amatucci, issued on "Journal of the Electrochemical Society, 152 (2) A307-A315 (2005)".

"Modified synthesis of [Fe/LiF/C] nanocomposite, and its application as conversion cathode material in lithium batteries", by Raju Prakash, Clemens Wall, Ajay Kumar Mishra, Christian Kü bel, Mohammad Ghafari, Horst Hahn, Maximilian Fichtner, issued on "Journal of Power Sources 196 (2011) 5936-5944".

(56) References Cited

OTHER PUBLICATIONS

"Formation, dynamics, and implication of solid electrolyte interphase in high voltage reversible conversion fluoride nanocomposites", by Andrew J. Gmitter, Fadwa Badway, Sylvie Rangan, Robert A. Bartynski, Anna Halajko, Nathalie Pereiraa and Glenn G. Amatucci, issued on "J. Mater. Chem., 2010, 20, 4149-4161".

"Thermal stability of FeF3 cathode for Li-ion batteries", by Mingjiong Zhoua, Liwei Zhao, Takayuki Doi, Shigeto Okada, Jun-ichi Yamaki, issued on "Journal of Power Sources 195 (2010) 4952-4956".

"Identifying the Local Structures Formed during Lithiation of the Conversion Material, Iron Fluoride, in a Li Ion Battery: A Solid-State NMR, X-ray Diffraction, and Pair Distribution Function Analysis Study", by Naoko Yamakawa, Meng Jiang, Baris Key, and Clare P. Grey, issued on "J. Am. Chem. Soc. 2009, 131, 10525-10536".

"Electrochemical Properties of MnF2 Films Fabricated by Pulsed Laser Deposition", by Cui Yan-Hua, Xue Ming-Zhe, Hu Ke, Li Da, Wang Xiao-Lin, Su Wei, Liu Xiao-Jiang, Meng Fan-Ming, Fu Zheng-Wen, issued on "Journal of Inorganic Material".

"LiF/Co Nanocomposite as a New Li Storage Material", by Yongning Zhou, Wenyuan Liu, Mingzhe Xue, Le Yu, Changliang Wu, Xiaojing Wu, and Zhengwen Fu, issued on "*Electrochemical and Solid-State Letters*, 9 (3) A147-A150 (2006)".

Extended European Search Report of European application No. 14776351.0 mailed Sep. 1, 2016; 9 pages.

"Comprehensive Insights into the Structural and Chemical Changes in Mixed-Anion FeOF Electrodes by Using Operando PDF and NMR Spectroscopy", by Kamila M. Wiaderek, Olaf J. Borkiewicz, Elizabeth Castillo-Martínez, Rosa Robert, Nathalie Pereira, Glenn G. Amatucci, Clare P. Grey, Peter J. Chupas, and Karena W. Chapman, issued on "Journal of the American Chemical Society", published Feb. 22, 2013.

"EELS compositional and valence mapping in iron fluoride-carbon nanocomposites", by Jafar F. Al-Sharab , James Bentley, Fadwa Badway, Glenn G. Amatucci and Frederic Cosandey, issued on J Nanopart Res (2013).

Rangan, Sylvie et al., "Electronic Structure and Chemical Composition of Candidate Conversion Material Iron Oxifluoride," issued on "220th ECS Meeting" Oct. 2011. Abstract only.

\* cited by examiner

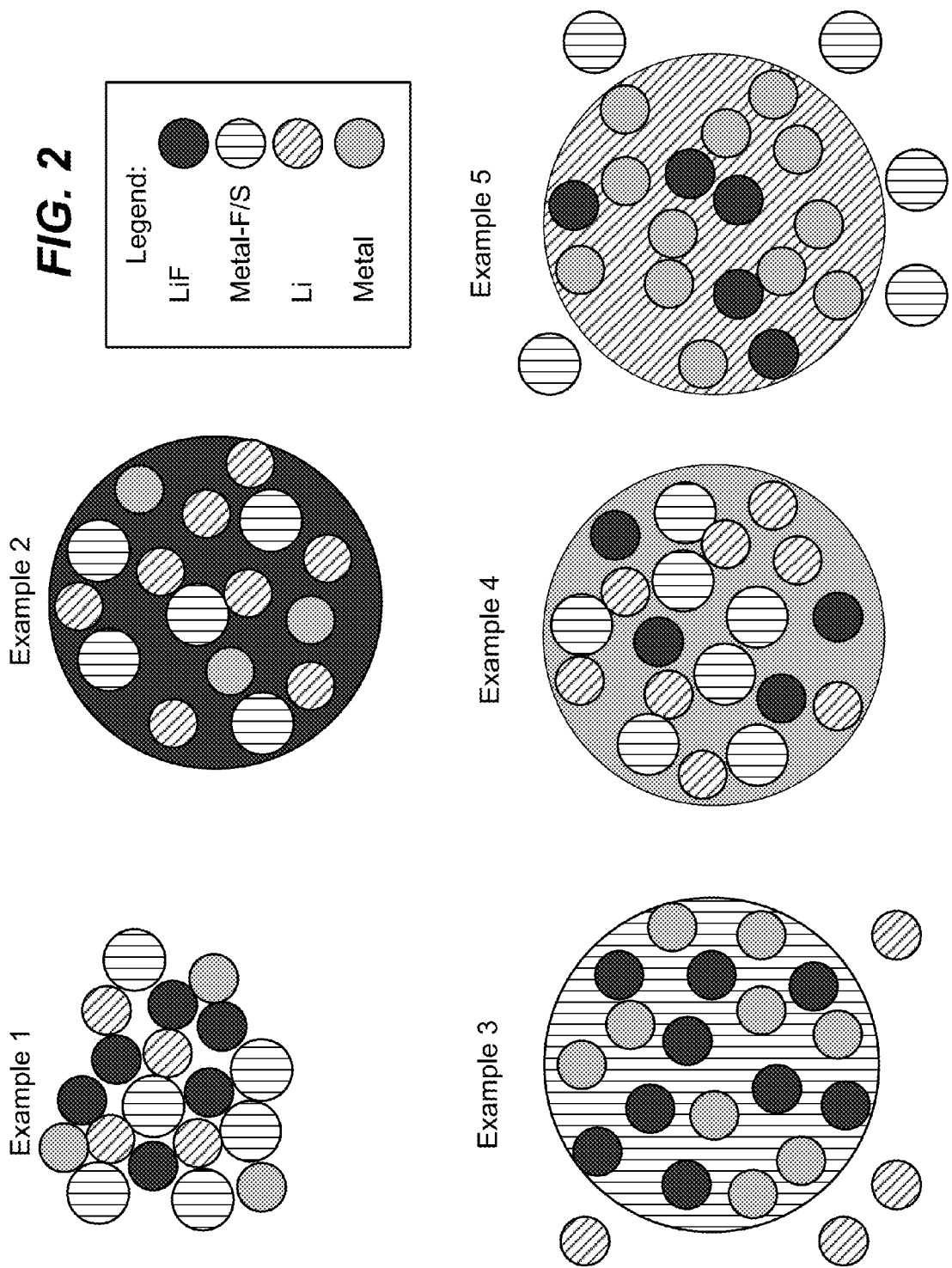

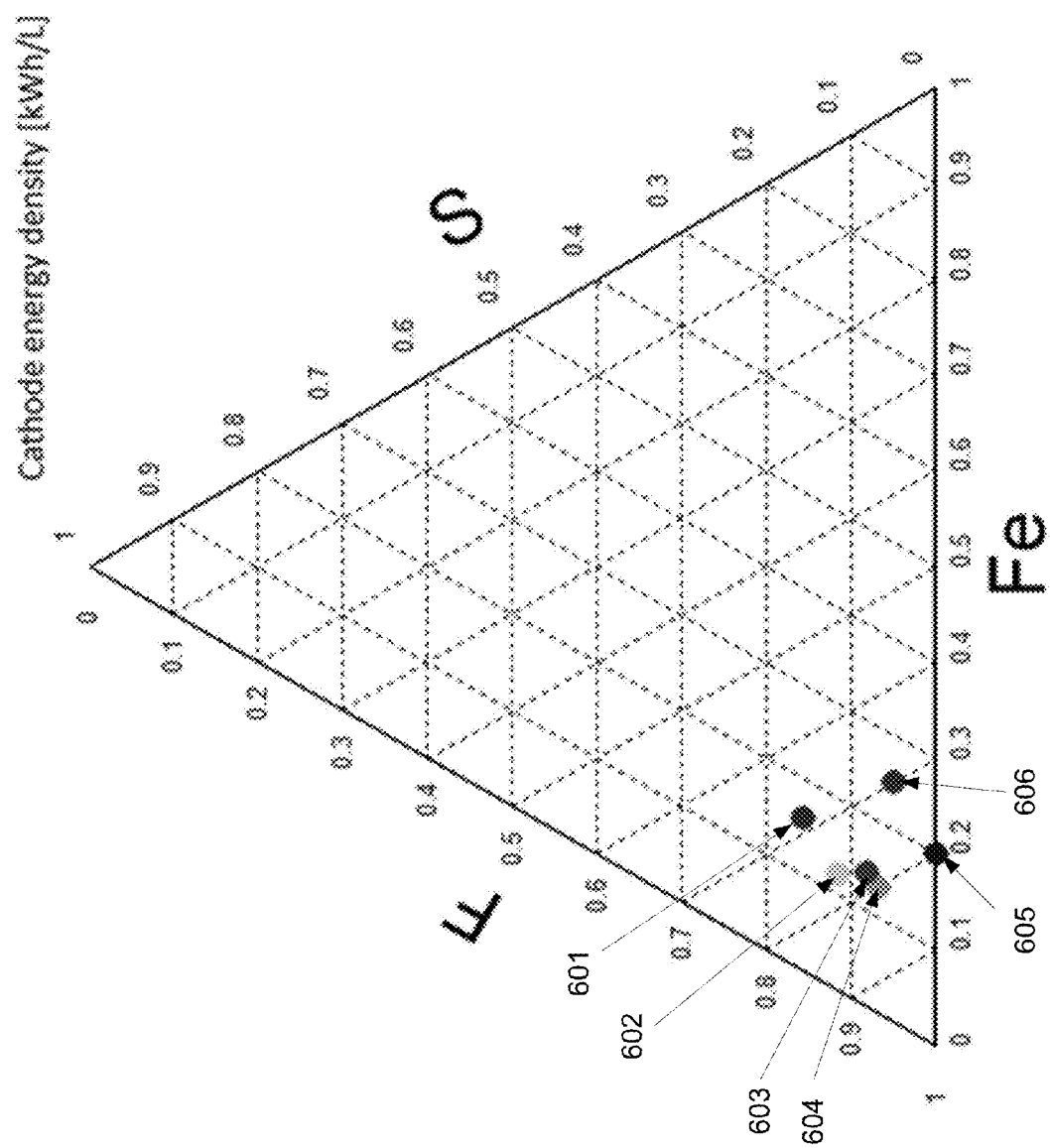

IRON, FLUORINE, SULFUR COMPOUNDS FOR BATTERY CELL CATHODES

CROSS-REFERENCE TO RELATED APPLICATION

This application claims benefit under 35 U.S.C. §119(e) of U.S. Provisional Patent Application No. 61/778,455, filed Mar. 13, 2013, and titled "IRON, FLUORINE, SULFUR COMPOUNDS FOR BATTERY CELL CATHODES," which is incorporated by reference herein in its entirety and for all purposes.

BACKGROUND

The adverse environmental effects from the consumption of fossil fuel have motivated both public and private sectors to seek clean energy conversion technologies such as battery systems. In the past, many battery types have been developed and used, with their respective advantages and disadvantages. For its chemical properties, including high charge density, lithium material has been used as a battery electrode. For example, in a rechargeable lithium-ion battery, lithium ions move from negative electrode to the positive electrode during discharge. In the basic operations of a lithium battery, an electrode material undergoes a reaction with lithium, and the performance of the material is an important aspect of a battery.

Unfortunately, conventional battery systems and their manufacturing and processes result in relatively high cost, low energy density batteries that may not meet market demands for many applications. Therefore, it is desirable to have new systems and fabrication techniques for batteries.

SUMMARY

One aspect of this disclosure involves a cathode for a battery including an electrochemically active material or combination of electrochemically active materials which includes (i) a compound of the formula $FeF_aS_bO_c$; and/or (ii) a combination of iron metal, and lithium fluoride, lithium oxide, and/or lithium sulfide, such that the atomic ratio of the iron to fluorine, sulfur, and oxygen in (i) and (ii) is 1:a:b:c, and $1 \le a \le 9$, $0 < b \le 3$, and $0 \le c \le 2$. In some embodiments, the atomic ratio of the iron to fluorine, sulfur, and oxygen is $1 \le a \le 5$, $0 < b \le 2$, and $0 \le c \le 1.5$. In some embodiments, the atomic ratio of the iron to fluorine, sulfur, and oxygen is $2 \le a \le 4$, $0 < b \le 1$, and $0 \le c \le 0.8$.

In some embodiments, the compound of the formula $FeF_aS_bO_c$ has a discharge capacity of at least about 400 mAh/g when discharged from 4.5 volts versus a lithium metal electrode to 1 volt versus the lithium metal electrode, and when discharged at a rate of 400 mA/g and at a temperature of 40-120° C. In some embodiments, the compound of the formula $FeF_aS_bO_c$ has an average discharge voltage of at least about 2 volts when discharged from 4.5 volts versus a lithium metal electrode to 1 volt versus the lithium metal electrode, and when discharged at a rate of 400 mA/g and at a temperature of 120° C. In some embodiments, the compound of the formula $FeF_aS_bO_c$ has an average hysteresis of at most about 2 volts when discharged from 4.5 volts versus a lithium metal electrode to 1 volt versus the lithium metal electrode, and when discharged at a rate of 400 mA/g and at a temperature of 120° C. In some embodiments, the compound of the formula $FeF_aS_bO_c$ and lithium ions can undergo a reaction to produce iron metal, and lithium fluoride, oxide, and/or sulfide, and such that the reaction has a Gibbs free energy of at least about 500 kJ/mol. In some embodiments, the electrochemically active material or combination of electrochemically active materials includes particles having a median characteristic dimension of between about 10 nm and 10000 nm. In some embodiments, the electrochemically active material is glassy. In some embodiments, the electrochemically active material or combination of electrochemically active materials is provided in a layer having a thickness of between about 10 nm and 300 μm.

In various embodiments, the cathode further includes a current collector in electrical communication with the material or combination of materials. In some embodiments, the current collector includes copper, a copper alloy, nickel, steel, stainless steel, carbon-coated aluminum, aluminum or an aluminum alloy.

Another aspect of the disclosure involves an energy storage device including an anode, an electrolyte, and a cathode including a current collector, and electrochemically active material or combination of electrochemically active materials including: (i) a compound of the formula $FeF_aS_bO_c$; and/or (ii) a combination of iron metal, and lithium fluoride, lithium oxide, and/or lithium sulfide, such that the atomic ratio of the iron to fluorine, sulfur, and oxygen in (i) and (ii) is 1:a:b:c, and $1 \le a \le 9$, $0 < b \le 3$, and $0 \le c \le 2$. In some embodiments, $1.5 \le a \le 5$, $0 < b \le 2$, and $0 \le c \le 1$. In some embodiments, $2 \le a \le 4$, $0 < b \le 1$, and $0 \le c \le 0.8$. In some embodiments, the compound of the formula $FeF_aS_bO_c$ has a discharge capacity of at least about 400 mAh/g when discharged from 4.5 volts versus a lithium metal electrode to 1 volt versus the lithium metal electrode, when discharged at a rate of 400 mA/g and at a temperature of 120° C. In some embodiments, the compound of the formula $FeF_aS_bO_c$ has an average discharge voltage of at least about 2 volts when discharged from 4.5 volts versus a lithium metal electrode to 1 volt versus the lithium metal electrode, when discharged at a rate of 400 mA/g and at a temperature of 120° C. In some embodiments, the compound of the formula $FeF_aS_bO_c$ has an average hysteresis of at most about 2 volts when discharged from 4.5 volts versus a lithium metal electrode to 1 volt versus the lithium metal electrode, when discharged at a rate of 400 mA/g and at a temperature of 120° C.

In some embodiments, the compound of the formula $FeF_aS_bO_c$ and lithium ions can undergo a reaction to produce the iron metal, and the lithium fluoride, oxide, and/or sulfide, and such that the reaction has a Gibbs free energy of at least about 500 kJ/mol. In some embodiments, the electrochemically active material or combination of electrochemically active materials includes particles having a median characteristic dimension of between about 40 nm and 4000 nm. In some embodiments, the electrochemically active material has a glassy morphology. In some embodiments, the electrochemically active material or combination of electrochemically active materials is provided in a layer having a thickness of between about 10 nm and 300 μm.

In some embodiments, the current collector includes copper, a copper alloy, nickel, steel, stainless steel, aluminum or an aluminum alloy. In some embodiments, the anode includes lithium, magnesium, silicon, porous carbon, magnesium alloys, silicon alloys, tin, tin alloys, tin oxide, silicon oxide, and/or silicon nickel. In some embodiments, the anode includes lithium.

In some embodiments, the electrolyte is a solid state electrolyte including a material selected from the group consisting of LiPON, LISICON, thio-LISICON, lithium sulfide, an antiperovskite, $Li_2O$—$SiO_2$—$P_2O_5$, $Li_2O$—$SiO_2$—$ZrO_2$, Li—Al—Ti—P—O—N, $Li_{10}GeP_2S_{12}$, $Li_{1.5}Al_{0.5}Ge_{1.5}(PO_4)_3$, $Li_7La_3Zr_2O_{12}$, $Li_aAl_bGa_cB_dS_e$ $(PO_4)_f$, $Li_aAl_bGa_cB_dS_e(BO_3)_f$, $Li_aGe_bSi_c(PO_4)_e$, $Li_aGe_bSi_cS_d(BO_3)_e$, $Li_9SiAlO_8$, $Li_3Nd_3Te_2O_{12}$, $Li_5La_3M_2O_{12}$ (where M=Nb,Ta), $Li_{5-x}M_xLa_{3-x}Ta_2O_{12}$ (where M=Ca, Sr, Ba), LiPON, lithium phosphate, lanthanum lithium titanate, compounds having garnet structures, and β" alumina.

In some embodiments, the device has a specific energy of at least about 200 Wh/kg when measured at 60° C. and a current of 200 mA/g of active cathode material. In some embodiments, the device has an energy density of at least about 500 Wh/L when measured at 60° C. and a current of 200 mA/g of active cathode material. In some embodiments, the anode, electrolyte, and cathode, together include a stack of about 1 μm to 500 μm thickness.

In some embodiments, one or more additional stacks of the anode, electrolyte, and cathode is disposed on top of one another. In some embodiments, at least some of the stacks are bipolar. In some embodiments, the anode is formed in situ by plating lithium on a negative current collector.

In some embodiments, the electrolyte is a solid state electrolyte. In some embodiments, the cathode further includes an ionic conducting component and an electronic conducting component. In some implementations, the ionic conducting component and the electronic conducting component are provided in a mixed electron ion conductor.

Another aspect of the disclosure involves a method of preparing a cathode for a battery by preparing an electrochemically active material or combination of electrochemically active materials including: (i) a compound of the formula $FeF_aS_bO_c$; and/or (ii) a combination of iron metal, and lithium fluoride, oxide, and/or sulfide, such that the atomic ratio of the iron to fluorine, sulfur, and oxygen in (i) and (ii) is 1:a:b:c, and $1 \leq a \leq 9$, $0 < b \leq 3$, and $0 \leq c \leq 2$. The method may further include connecting the electrochemically active material to a current collector or a terminal for the battery.

In some embodiments, preparing the electrochemically active material or combination of electrochemically active materials includes a physical vapor deposition technique. In some embodiments, the physical vapor deposition technique includes sputtering from two or more targets. In some embodiments, preparing the electrochemically active material or combination of electrochemically active materials includes creating particles. In some embodiments, connecting the electrochemically active material to a current collector or a terminal includes electrophoretic deposition.

In some embodiments, connecting the electrochemically active material to a current collector or a terminal includes connecting with a binder. As an example, the electrochemically active material may be mixed with a binder to produce a composition that adheres to the current collector. In some embodiments, preparing the electrochemically active material or combination of electrochemically active materials includes an evaporation technique. In some embodiments, the evaporation technique includes vapor transport deposition or flash evaporation from two or more subliming sources including precursors of the electrochemically active material or combination of electrochemically active materials. In some embodiments, preparing the electrochemically active material or combination of electrochemically active materials includes a chemical vapor deposition technique.

In some embodiments, preparing the electrochemically active material or combination of electrochemically active materials includes precipitating from a solution. In some embodiments, the solution includes a dissolved ferric compound and a dissolved fluoride. In some embodiments, the fluoride is ammonium acid fluoride ($NH_4HF_2$). In some embodiments, the solution further includes a dissolved sulfur-containing compound. In some embodiments, the sulfur-containing compound is thiourea. In some embodiments, the method further includes treating a precipitate from the solution with a sulfur-containing compound to introduce sulfur into the precipitate. In some embodiments, the sulfur-containing compound is hydrogen sulfide. In some embodiments, the precipitating forms the material or materials or a precursor thereof directly on a current collecting substrate. In some embodiments, preparing the electrochemically active material or combination of electrochemically active materials includes depositing a layer of said material or materials to a thickness of between about 10 nm and 30 μm on a substrate.

In some embodiments, the atomic ratio of the iron to fluorine, sulfur, and oxygen is $1.5 \leq a \leq 5$, $0 < b \leq 2$, and $0 \leq c \leq 1$. In some embodiments, the atomic ratio of the iron to fluorine, sulfur, and oxygen $2 \leq a \leq 4$, $0 < b \leq 1$, and $0 \leq c \leq 0.8$.

In some embodiments, the fabricated compound of the formula $FeF_aS_bO_c$ has a discharge capacity of at least about 400 mAh/g when discharged from 4.5 volts versus a lithium metal electrode to 1 volt versus the lithium metal electrode, and when discharged at a rate of 400 mA/g and at a temperature of 120° C.

In some embodiments, the compound of the formula $FeF_aS_bO_c$ has an average discharge voltage of at least about 2 volts when discharged from 4.5 volts versus a lithium metal electrode to 1 volt versus the lithium metal electrode, and when discharged at a rate of 400 mA/g and at a temperature of 120° C.

In some embodiments, the compound of the formula $FeF_aS_bO_c$ has an average hysteresis of at most about 2 volts when discharged from 4.5 volts versus a lithium metal electrode to 1 volt versus the lithium metal electrode, and when discharged at a rate of 400 mA/g and at a temperature of 120° C.

In some embodiments, the compound of the formula $FeF_aS_bO_c$ and lithium ions can undergo a reaction to produce the iron metal, and the lithium fluoride, oxide, and/or sulfide, and such that the reaction has a Gibbs free energy of at least about 500 kJ/mol.

In some embodiments, preparing an electrochemically active material or combination of electrochemically active materials includes melt spinning, atomization, solid state synthesis, or milling.

Another aspect of the disclosure involves a cathode for a battery, the cathode including an electrochemically active material or combination of electrochemically active materials including: a compound including iron, fluorine, and sulfur; and/or a combination of iron metal, and lithium fluoride, lithium oxide, and/or lithium sulfide, such that the electrochemically active material or combination of electrochemically active materials has a specific capacity of at least about 300 mAh/g when discharged to a voltage of 2.5 volts relative to lithium, at a rate of 400 mA/g, and at a temperature of 120° C., after being charged to a voltage of 3.9 volts relative to lithium.

In some embodiments, the compound including iron, fluorine, and sulfur has the formula $FeF_aS_bO_c$; and $1 \leq a \leq 9$, $0 < b \leq 3$, and $0 \leq c \leq 2$.

In some embodiments, the combination of iron metal, and lithium fluoride, lithium oxide, and/or lithium sulfide has an atomic ratio of the iron to fluorine, sulfur, and oxygen of 1:a:b:c, and $1 \leq a \leq 9$, $0 < b \leq 3$, and $0 \leq c \leq 2$.

In some embodiments, the compound including iron, fluorine, and sulfur has a discharge capacity of at least about 400 mAh/g when discharged from 4.5 volts versus a lithium metal electrode to 1 volt versus the lithium metal electrode, and when discharged at a rate of 400 mA/g and at a temperature of 120° C.

In some embodiments, the compound including iron, fluorine, and sulfur has an average discharge voltage of at least about 2 volts when discharged from 4.5 volts versus a lithium metal electrode to 1 volt versus the lithium metal electrode, and when discharged at a rate of 400 mA/g and at a temperature of 120° C.

In some embodiments, the compound including iron, fluorine, and sulfur has an average hysteresis of at most about 2 volts when discharged from 4.5 volts versus a lithium metal electrode to 1 volt versus the lithium metal electrode, and when discharged at a rate of 400 mA/g and at a temperature of 120° C.

Another aspect of this disclosure involves a cathode for a battery, the cathode including an electrochemically active material or combination of electrochemically active materials including: a compound including iron, fluorine, and sulfur; and/or a combination of iron metal, and lithium fluoride, lithium oxide, and/or lithium sulfide, such that the electrochemically active material or combination of electrochemically active materials has a specific capacity of at least about 500 mAh/g when discharged to a voltage of 1 volt relative to lithium, at a rate of 400 mA/g, and at a temperature of 120° C., after being charged to a voltage of 3.9 volts relative to lithium.

Another aspect of this disclosure involves a cathode for a battery, the cathode including an electrochemically active material or combination of electrochemically active materials including: a compound including iron, fluorine, and sulfur; and/or a combination of iron metal, and lithium fluoride, lithium oxide, and/or lithium sulfide, such that the electrochemically active material or combination of electrochemically active materials has a specific energy of at least about 600 mWh/g when discharged to a voltage of 2.9 volts relative to lithium, at a rate of 400 mA/g, and at a temperature of 120° C., after being charged to a voltage of 3.9 volts relative to lithium.

Another aspect of this disclosure involves a cathode for a battery, the cathode including an electrochemically active material or combination of electrochemically active materials including: a compound including iron, fluorine, and sulfur; and/or a combination of iron metal, and lithium fluoride, lithium oxide, and/or lithium sulfide, such that the electrochemically active material or combination of electrochemically active materials has a specific energy of at least about 1000 mWh/g when discharged to a voltage of 1 volt relative to lithium, at a rate of 400 mA/g, and at a temperature of 120° C., after being charged to a voltage of 3.9 volts relative to lithium.

These and other features of the disclosure will be presented in more detail below with reference to the associated figures.

BRIEF DESCRIPTION OF THE DRAWINGS

FIG. 2 depicts five examples of electrode formats in accordance with various embodiments.

FIGS. 6A-6J are ternary phase diagrams illustrating electrochemical parameters for each of four compositions in accordance with various embodiments.

DETAILED DESCRIPTION

Figure 1A:
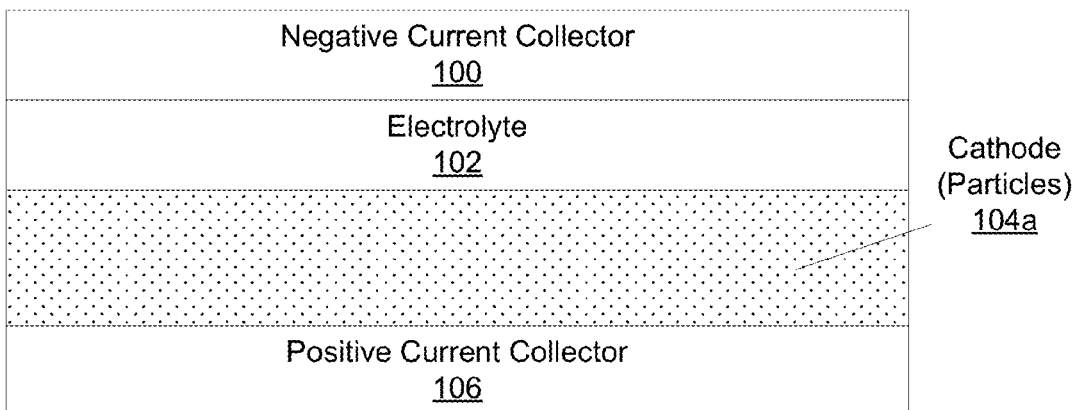
FIGS. 1A and 1B are schematic illustrations of electrochemical cells.

The following description is presented to enable one of ordinary skill in the art to make and use the disclosed embodiments and to incorporate it in the context of particular applications. Various modifications, as well as a variety of uses in different applications will be readily apparent to those skilled in the art, and the general principles defined herein may be applied to a wide range of embodiments. Thus, the disclosed embodiments is not intended to be limited to the embodiments presented, but is to be accorded the widest scope consistent with the principles and novel features disclosed herein.

In the following detailed description, numerous specific details are set forth in order to provide a more thorough understanding of the disclosed embodiments. However, it will be apparent to one skilled in the art that the disclosed embodiments may be practiced without necessarily being limited to these specific details. In other instances, well-known structures and devices are shown in block diagram form, rather than in detail, in order to avoid obscuring the disclosed embodiments.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. §112(f). In particular, the use of "step of" or "act of" in the Claims herein is not intended to invoke the provisions of 35 U.S.C. §112(f).

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Batteries and their electrodes undergo electrochemical transitions during discharge and, in the case of secondary or rechargeable batteries, charge. Due to its high charge density, lithium has been used in various battery types. A lithium-ion battery may include a cathode of insertion material or intercalation material. Insertion or intercalation material may be molecules which may be included between other molecules. In a rechargeable lithium-ion battery, lithium ions move from the anode (or negative electrode) to the cathode (or positive electrode) during discharge. Unfortunately, conventional lithium-ion batteries typically have a relatively high cost and low energy density, and therefore may not meet demands for many applications.

The present disclosure concerns cathodes having active materials containing iron, fluorine, and sulfur. Cathodes contain materials that participate in reactions that facilitate charge and discharge to produce electrical energy, and such materials may be broadly termed "active materials" or "electrochemically active materials." In various embodiments, about 90% of a cathode may include active material. An example of an active material is an intercalation material. In general, active materials may be used in battery systems. Intercalation materials, which can be prepared at a macro scale or at a nano scale, typically have relatively low energy density (e.g., less than about 800 Wh/kg of active material).

Cathode materials may exist in a discharged state, a charged state, or an intermediate charge state. In some cases, a battery is designed or operated so that full discharge is never attained. Thus, if the fully charged material is $FeF_aS_bO_c$, for example, the "fully" discharged cathode may contain a mixture of elemental iron (Fe) alone or in an alloy or mixture, lithium fluoride (LiF), lithium sulfide ($Li_2S$), and optionally lithium oxide ($Li_2O$). The use of "discharged" or "discharged state" herein is a relative term, referring only to a state of an active material that is more discharged than a charged state of the active material. The use of "charged" or "charged state" herein refers to a state of an active material that is more charged than a corresponding discharge state of the material.

The disclosed embodiments concern cathodes containing a high capacity material that reversibly undergoes a redox reaction at a high rate over many cycles of charge and discharge. In the discharged state, the high capacity material contains an elemental metal (or an alloy thereof) and one or more lithium compounds. In some embodiments, the metal or alloy is embedded in a continuous matrix of the lithium compound. In other embodiments, the metal or alloy and lithium compound are present in small particles or other discrete structures.

In some implementations, the metal is elemental iron, cobalt, manganese, or copper and the lithium compound includes lithium fluoride and lithium sulfide and optionally lithium oxide. In the charged state, the high capacity material contains a compound of the metal, which may contain fluorine, sulfur, and optionally oxygen. At least some of the metal may exist as a fluoride, a sulfide, and/or a sulfur fluoride. In various embodiments, the high capacity material contains a single compound of iron, fluorine, sulfur, and optionally oxygen.

Iron and iron compounds will be used in the following discussion. It should be understood, however, that in each instance where iron is presented, other metals such as copper, cobalt and manganese may be substituted, so long as the substitution produces an electrode or device meeting the disclosed functional requirements.

In some embodiments, the stoichiometry of iron-sulfur-fluorine compounds in the fully charged state is given by $FeF_aS_bO_c$ where $1 \leq a \leq 9$; $0 < b \leq 3$; $0 \leq c \leq 2$. In further embodiments, the stoichiometry is given by $1.5 \leq a \leq 5$; $0 < b \leq 2$; $0 \leq c \leq 1$. In still further embodiments, the stoichiometry is given by $2 \leq a \leq 4$; $0 < b \leq 1$; $0 \leq c \leq 0.8$.

Cathodes constructed from electrochemically active materials having these and related compositions perform at a high level in battery systems. For example, such materials may have a specific capacity of greater than about 400 mAh/g when discharged between 1 and 4.5V versus a standard lithium metal electrode (Li/Li$^+$) at a rate of 400 mA/g and a temperature of about 120° C. In some cases, cathodes fabricated from such materials have a high average discharge voltage greater than about 2V when discharged under above conditions. Further, in some cases, the cathode exhibits an average hysteresis of less than about 2V when charged and discharged between 1 and 4.5V versus a lithium metal electrode at a rate of 400 mA/g and a temperature of about 120° C.

Additionally, the iron, fluorine, and sulfur-containing compounds disclosed herein may have a relatively high specific energy. For example, the specific energy may be at least about 800 mWh/g or at least about 1000 mWh/g, when discharged between 1 and 4.5V versus a standard lithium metal electrode (Li/Li$^+$) at a rate of 400 mA/g and a temperature of 120° C.

The high performance cathode materials disclosed herein maintain their good performance (e.g., high specific capacity, high energy density, high average discharge voltage, and low hysteresis) even when discharged at high rates. As shown in the examples below, their performance may not significantly degrade when the rate of discharge increases from 10 C to 100 C. In some embodiments, the cathode materials maintain these properties over multiple cycles. In various embodiments, the material maintains these properties over at least about 10 cycles or at least about 100 cycles or at least about 500 cycles.

Still further, the iron, fluorine, and sulfur containing compounds disclosed herein may be relatively conductive—ionically and electronically. They are generally more conductive than ferric fluoride, for example. The high conductivity permits fabrication of cathodes from relatively larger particles; e.g., particles having a median cross-sectional dimension of up to about 3 μm while still maintaining 1 C rate capability. It can be difficult and expensive to produce the smaller particles that must be used with less conductive active materials. Larger particles only function at acceptable charge/discharge rates because the active material is relatively conductive. The material should be sufficiently conductive that ions and electrons can find their way into the interior of the particles over the duration of discharge, which may be a high rate (e.g., about 10 C to 100 C).

Large particles have the additional advantage of allowing one to easily densify a cathode electrode produced by conventional slurry coating. Typically, slurry coating puts down a layer that is only about 30% dense in active material. After densification process, that density can increase to 70-80% with larger particles.

Another reason why larger particles are desirable is that relatively little of the active material will be consumed during formation of solid electrolyte interface (SEI) layers. Smaller particles have a higher ratio of surface area to volume. As a consequence, they have proportionately more surface area for SEI formation, and consequently a relatively large consumption of active material into non-productive SEI material.

The iron-sulfur-fluorine materials disclosed herein may be fabricated by various techniques. Such techniques include physical vapor techniques, chemical vapor techniques, solid state synthesis, and wet chemical techniques.

In some implementations, wet chemical fabrication techniques employ solvents that are evaporated or otherwise induced to precipitate a compound of appropriate composition. As an example, the solvent may be water or ethanol. Various soluble precursor materials may serve as sources of each of three components (Fe, F, and S). As an example, unlithiated cathode material may be fabricated from a water-based solution, pH adjusted to be basic, a ferric salt such as ferric nitrate $Fe(NO_3)_3$, thiourea ($CS(NH_2)_2$), and an ammonium fluoride such as $NH_4HF_2$. When provided in appropriate ratios, these precursors give a $FeS_x$ and $FeF_x$ mixture. As a further example, lithiated cathode material may be fabricated from a water-based solution, pH adjusted to be basic, LiCl, thiourea, $NH_4HF_2$. Such solutions can produce $Li_xS$ and LiF as precipitates, which are discharge products of the cathode. This means that if the sulfur and fluorine anions are the limiting reactant in solution, they will not react with another metal cation in solution. As a source of iron cation, one may add $Fe(NO_3)_3$ to the solution with a reducing agent such as $NaH_2PO_3$, formaldehyde, or formic acid. In such implementations, the solution reduces the metal ion in a manner that embeds the ion in a matrix of $Li_xS$ and LiF.

Cell Structure Types

In some implementations, the material described here is provided in particulate form (containing a collection of discrete unconnected particles). In some embodiments, it is provided in the form of one or more continuous layers having a matrix such as the lithium compound or an ion conductor with embedded particles or regions of the metal component and/or the lithium compound component. In some embodiments, the individual particles contain mixtures of the metal component and one or more of the lithium compound components. In some embodiments, some particles contain solely the metal component. In some embodiments, some particles contain solely one or more lithium compound components.

In various embodiments, the cathode includes particles of electrochemically active material. FIG. 1A shows an example of a cell structure, which includes negative current collector 100, electrolyte 102, cathode layer 104a including particles, and positive current collector 106. The negative current collector 100 contacts the electrolyte 102, which in turn contacts the cathode layer including its constituent particles 104a. The cathode layer of particles 104a also contacts the positive current collector 106. The cathode may include an additive to improve electronic conductivity between the active cathode particles and the positive current collector. Such an additive may be a carbon particle or a mixed electron-ion conductor (MEIC).

In some embodiments, the cell includes a single liquid phase electrolyte, often in conjunction with an intercalation type anode. In such embodiments, a porous separator may be used to prevent contact between the anode and cathode.

In some embodiments, a two-phase electrolyte may be used. In one example, the cathode includes a liquid catholyte surrounding the particles of active cathode material, and the catholyte may be separated from the anode by a layer of solid state electrolyte. The catholyte and cathode particles together form a cathode layer as depicted in layer 104a and the electrolyte layer may correspond to layer 102 as shown in FIG. 1A. The liquid phase catholyte material is conductive to ions but may be insufficiently conductive to electrons, in which case an additive, such as carbon or another electronically conductive material, may be added to the cathode. In embodiments employing lithium or another metal anode, the solid state portion of the separator or electrolyte may help prevent metal dendrites from forming.

Catholyte compositions may include carbonate electrolytes (e.g., EC (ethylene carbonate), DEC (diethyl carbonate), DMC (dimethyl carbonate), EMC (ethyl methyl carbonate), VC (vinylene carbonate), FEC (fluoroethylene carbonate), PC (propylene carbonate) with salts such as LiTFSI (lithium bis(trifluoromethanesulfonyl)imide), LiPF6 (lithium hexafluorophosphate), LiBOB (lithium bis(oxalate) borate), LiODFB (lithium oxalyldifluoroborate), LiFAP (lithium fluoroalkylphosphate), LiFSI (lithium bis(fluorosulfonyl)imide), etc.) or non-carbonate electrolytes (e.g., ionic liquids, siloxanes, ethers, nitriles, glymes, etc.). Catholytes may have high voltage and low voltage stability (down to about 1V since the cathode may operate down to a low voltage limit, and up to about 4.5V or greater). Some species for catholyte compositions have high temperature stability, such as siloxanes and other organosilicons.

As mentioned, a solid phase electrolyte may be used. The cathode may also include an electron conductor, an ion conductor, and/or an MEIC. Various solid phase electrolytes are described in U.S. Provisional Patent Application No. 61/778,455, filed on Mar. 13, 2013, which is incorporated herein by reference in its entirety. Examples of solid phase electrolytes include LXPS, LSPS, and LiPON (lithium phosphorus oxynitride). Carbon or carbon materials may be added to improve the electronic conductivity.

Figure 1B:
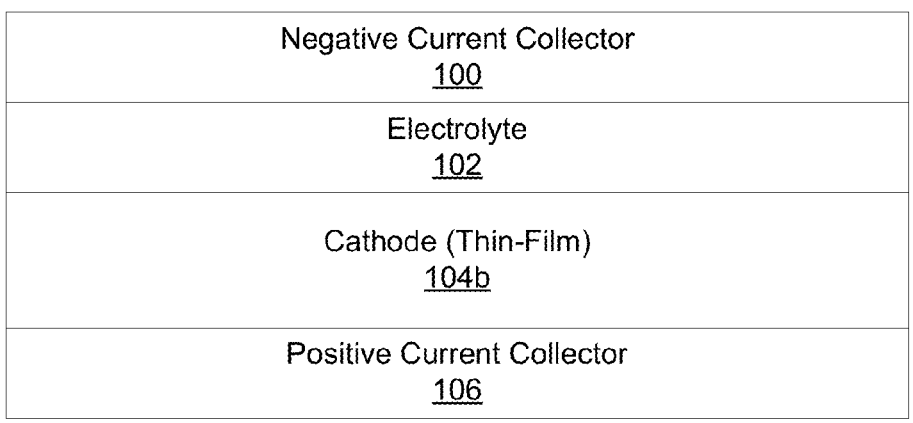

FIG. 1B schematically depicts a thin-film cell format. In various embodiments, a thin film of electrochemically active cathode material 104b is provided between a positive current collector 106 and a thin protective layer (not shown but described in more detail below). The cathode thin film may be a continuous and non-particulate. The protective layer may contact an electrolyte 102, which may be in solid phase or liquid phase. The electrolyte 102, in turn, contacts an anode (not shown) or negative current collector 100. If the electrolyte 102 contacts the negative current collector 100, it may do so only in the discharged state. In a charged state, a metallic anode (not shown) may be deposited in between the electrolyte 102 and the negative current collector 100. Lithium is one example of such a metallic anode material. In various embodiments, the cathode layer 104b without cathode particles may have a thickness of about 1 micrometer or less, or about 500 nanometers or less, or about 200 nanometers or less.

Composition and Morphology

In some embodiments, when an electrochemical device is in the discharged state, the positive electrode or cathode includes an active component that includes an elemental metal or alloy component and two or more lithium compound components. In some embodiments, when the device is partially discharged, for example down to 2.9V instead of 1V versus a lithium metal electrode, the cathode material may not be simply a metal component and lithium compound components. In this region, the cathode material may include a lithium intercalation compound component such as a lithium intercalated metal sulfur fluoride compound. At relatively high voltages versus lithium metal, such intercalation compounds may have a high capacity. In a fully charged state, for example above 2.9V versus lithium metal, the cathode may contain a metal sulfur fluoride compound component.

Generally the metal component can be any metal or mixture or alloy of metals. In one embodiment the metal component is a transition metal or mixtures or alloys of transition metals. In one embodiment the metal component is selected from bismuth (Bi), aluminum (Al), titanium (Ti), vanadium (V), chromium (Cr), manganese (Mn), iron (Fe), cobalt (Co), nickel (Ni), copper (Cu), molybdenum (Mo), tungsten (W), ruthenium (Ru), or mixtures or alloys of the foregoing. In one embodiment the metal component is selected from Fe, Cu, Mn and Co. In one embodiment the metal component is Fe. In one embodiment the metal component is Cu. In one embodiment the metal component is Co.

In certain embodiments, the metal component includes a mixture or alloy of a first metal and a second metal. In some examples of a mixed metal component, the metal component includes separate particles of the first metal and the second metal. In other examples, the metal component includes particles of a mixture or alloy of the first and second metals. In one embodiment, the first metal is Fe and the second metal is Cu.

Generally the lithium compounds are compounds that upon charging in an electrochemical cell yield (i) lithium ions, which migrate to the anode, and (ii) anions that react with the metal component to provide a metal compound. In the charged state, therefore, the cathode material contains a metal compound. In certain embodiments, the anions in the lithium compounds are fluoride and sulfide and optionally oxide. In one embodiment, the lithium compounds are lithium fluoride and lithium sulfide.

In some embodiments, the stoichiometry of an iron-sulfur-fluorine compound in the fully charged state is given by $FeF_aS_bO_c$ where $1 \leq a \leq 9$; $0 < b \leq 3$; $0 \leq c \leq 2$. In further embodiments, the stoichiometry is given by $1.5 \leq a \leq 5$; $0 < b \leq 2$; $0 \leq c \leq 1$. In still further embodiments, the stoichiometry is given by $2 \leq a \leq 4$; $0 < b \leq 1$; $0 \leq c \leq 0.8$. In some embodiments, the discharged active material contains elemental iron (alone or in an alloy or mixture), lithium fluoride, lithium sulfide, and optionally lithium oxide, where the ratio of iron to fluorine to sulfur to oxygen in the discharged material is given by 1:a:b:c, where $1 \leq a \leq 9$; $0 < b \leq 3$; $0 \leq c \leq 2$. In further embodiments, the ratio is given by $1.5 \leq a \leq 5$; $0 < b \leq 2$; $0 \leq c \leq 1$. In still further embodiments, the ratio is given by $2 \leq a \leq 4$; $0 < b \leq 1$; $0 \leq c \leq 0.8$.

Chemical Reaction and Properties

In the charged state, the active material contains a compound of a metal. Such material is sometimes referred to as a conversion material to distinguish insertion materials such as lithium cobalt oxide and lithium manganese oxide. Generally, the complete charge/discharge reaction of the disclosed conversion materials may be represented by the following equation:

$$Fe + aLiF + bLi_2S + cLi_2O \leftrightarrow FeF_aS_bO_c + (a+2b+2c)Li^+ + (a+2b+2c)e^- \quad (1)$$

The metal compound $FeF_aS_bO_c$ present in the charged cathode material reacts with lithium ions according to a discharge path of the above equation. Typically, the discharge reaction is associated with an appropriately large Gibbs free energy when considering the full cell reaction $(a+2b+2c)Li + FeF_aS_bO_c \rightarrow aLiF + bLi_2S + cLi_2O + Fe$.

The Gibbs energy corresponds to the cell voltage of the reaction by

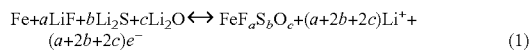

$$\Delta G_{rxn} = -E^* n^* F \quad (2)$$

where E is the voltage, n is the number of electrons that react and F is the Faraday constant. In certain embodiments the Gibbs energy of the reaction is about 500 kJ/mol or about 750 kJ/mol or about 1 MJ/mol.

Cathodes constructed from electrochemically active materials having these and related compositions perform at a high level in battery systems. For example, such materials may have a specific capacity of greater than about 400 mAh/g when discharged between 1 and 4.5V versus a standard lithium metal electrode (Li/Li$^+$) at a rate of 400 mA/g and a temperature of about 120° C. In some cases, cathodes fabricated from such materials have a high average discharge voltage greater than about 2V when discharged under above conditions. Further, in some cases, the cathode exhibits an average hysteresis of less than about 2V when charged and discharged between 1 and 4.5V versus a lithium metal electrode at a rate of 400 mA/g and a temperature of about 120° C.

Example Electrodes with Active Materials

FIG. 2 depicts five examples of electrode formats that may exist in the cell as fabricated, or at any point in the cell state of charge. Many variations, alternatives, and modifications are possible. The particles or domains described above are nanostructured (e.g., separated from one another by less than about 20 nm length scale), and these particles or domains may be combined to form primary and secondary particle structures shown in Examples 1-4 in FIG. 2.

Example 1 depicts an embodiment in which the electrode active material includes non-encapsulated particles of lithium fluoride/sulfide, elemental metal, lithium metal, and metal fluoride/sulfide. The lithium fluoride/sulfide may exist as intimately mixed lithium fluoride and lithium sulfide or separate particles of lithium fluoride and lithium sulfide. The metal fluoride/sulfide may exist as intimately mixed metal fluoride and metal sulfide or separate particles of metal fluoride and metal sulfide. In various embodiments, the metal is iron. The material in Example 1 may exist at any state of charge, but will most typically exist at or near full discharge.

Example 2 depicts an electrode format in which elemental metal, metal fluoride/sulfide, and lithium metal are encapsulated in a lithium fluoride and/or lithium sulfide matrix. In each of the encapsulation examples, the encapsulation unit may exist as distinct particles or as a continuous layer. Example 3 illustrates a format in which a metal fluoride and/or metal sulfide matrix encapsulates lithium fluoride and/or lithium sulfide particles and elemental metal particles. Distinct particles of lithium exist alongside particles of the metal fluoride/sulfide encapsulation unit. Example 4 depicts a format in which the elemental metal encapsulates particles of lithium fluoride/sulfide, particles of metal fluoride/sulfide, and particles of lithium. Example 5 depicts a format in which lithium metal encapsulates particles of the other metal and particles of lithium fluoride/sulfide. Separate particles of metal fluoride/sulfide are present in this example. Note that the metallic lithium may be included in the cathode, as fabricated or otherwise, in order to provide sufficient lithium ions to compensate for a device's coulombic inefficiency during formation and/or normal end use in conventional application.

In all examples above, the electrode particle may optionally be coated with carbon or include carbon in the interior to increase the electronic conductivity within the particle. In certain embodiments, the electrode particles have less than about 10% carbon by weight, or less than about 5% carbon by weight.

In some embodiments disclosed herein, the particle shapes and sizes may be varied as follows. As examples, the particles of active material in the cathode have a median characteristic dimension of about 100 nm to about 5000 nm or between about 300 nm to about 4000 nm or between about 800 nm to about 3000 nm. In some embodiments, these particles have a standard deviation of about 50% or less. These ranges apply regardless of whether the particles are isolated or embedded in a matrix. These ranges are understood to apply to agglomerates, or secondary particles, that may have a finer structure within them, frequently as primary particles or nanocrystals. In some embodiments, the material in the particles has a glassy or amorphous morphology.

Particles in these size regimes are easier to process and fabricate than smaller particles. As a consequence, electrodes employing particles of the recited sizes are relatively inexpensive. Of course, these particles should be sufficiently conductive, electronically and ionically, to allow the material in the interior of such particles to react over the course of discharge. In certain embodiments, the active material (e.g., a metal sulfur fluoride compound) has an electron conductivity of at least about $10^{-8}$ S/cm and has a lithium ion conductivity of at least about $10^{-8}$ S/cm.

The relative amounts of the lithium compounds and the metal component can vary widely, but should be appropriate for a battery cell. In other words, the components should be provided in relative amounts that do not introduce substantial unused material that will not contribute to electrochemical energy conversion or enhance conductivity. In some embodiments employing iron as the metal component, the mole ratio of iron to lithium in the cathode active material is about 1 to 3, or about 1.2 to 3. In some embodiments employing valence 2 metals (in the oxidized state) such as copper, the mole ratio of metal to lithium in the cathode active material is about 1 to 2 or about 1.2 to 2.

Cathode Active Component—Lithium Metal Compound Component

As mentioned, at some point in the state of charge of the electrode, the cathode may include an active component that includes a lithium metal compound component. Generally the lithium metal compound component is any compound that includes lithium, a non-lithium metal and an anion and that, upon charging of the device, yields lithium ions that migrate to the anode and a metal compound.

In one embodiment such reaction may be written as

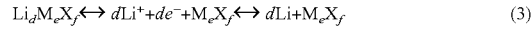

$$Li_dM_eX_f \leftrightarrow dLi^+ + de^- + M_eX_f \leftrightarrow dLi + M_eX_f \qquad (3)$$

The left side of equation 3 represents the cathode active material in the discharged state, where the cathode active component contains a lithium metal component, $Li_dM_eX_f$, and the right side of equation 1 represents the system in the charged state in which the active materials have been converted into the metal compound component, $M_eX_f$. The middle of the equation shows the lithium ions are provided for diffusion through the electrolyte to the anode and the electrons are provided to the external circuit. X represents a combination of fluoride and sulfide and optionally oxide. In reaction 3 all of the lithium in the lithium metal compound is converted to lithium ions. In some embodiments, less than all of the lithium in the lithium metal compound is converted to lithium ions. One embodiment of such reaction is given in equation 4:

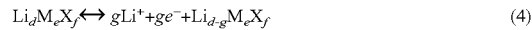

$$Li_dM_eX_f \leftrightarrow gLi^+ + ge^- + Li_{d-g}M_eX_f \qquad (4)$$

where g<d. Depending on the thermodynamic and kinetic stability of the $Li_{d-g}M_eX_f$ compound, such compound may exist as $Li_{d-g}M_eX_f$ or may be disproportionate to a mixture of one or more of lithium compounds (typically lithium fluoride and lithium sulfide), a metal compound and a lithium metal compound.

In one embodiment, the lithium metal compound component is a mixture of a lithium metal halide and a lithium metal sulfide and optionally a lithium metal oxide. In many embodiments, the lithium metal halide is lithium fluoride. In one embodiment the lithium metal compound component is a lithium iron fluoride sulfide. In one embodiment the lithium metal compound component is a lithium copper fluoride sulfide. In one embodiment the lithium metal compound component is a lithium cobalt fluoride sulfide.

Cathode Active Component—Metal Component, Lithium Compound Component and Lithium Metal Compound Component In certain implementations, at some point in the state of charge of the electrode, the cathode material includes an active component containing a metal component, lithium compound components and a lithium metal compound component. These materials may exist in any of the forms shown and described with respect to FIG. 2. The metal component, lithium compound component and lithium metal compound component may be as described above. In embodiments of the device, the metal, lithium metal compound and/or lithium compound may each have a median characteristic dimension of between about 1 and 100 nm, between about 2 and 50 nm, or between about 2 and 20 nm. These dimensions are primary particle or nanocrystal sizes. These primary particles may be agglomerated into secondary particles of dimensions of about 500 to 3000 nm in some embodiments.

Cathode Active Component—Metal Compound Structure

As shown in equations 1, 3 and 4 above, in the charged state, the cathode active component includes a metal compound component, which includes a metal and two or more anions. In certain embodiments, the metal compound component is a mixed halide and chalcogenide. In certain embodiments, the metal compound is a mixed halide, chalcogenide, and oxide. The halide atoms can be F, Cl, Br, and/or I. The chalcogenide atoms can be S, Se, and/or Te. In certain embodiments, the metal is selected from Bi, Ti, V, Cr, Mn, Fe, Co, Ni, Cu, Mo, W and Ru. In one embodiment, the metal compound component is a mixed fluoride and sulfide of a metal selected from Bi, Ti, V, Cr, Mn, Fe, Co, Ni, Cu, Mo, W and Ru. In one embodiment, the metal compound component is a mixed fluoride and sulfide of a metal selected from Fe, Cu or Co.

As mentioned, the stoichiometry of iron-sulfur-fluorine compounds in a fully charged state may be given by $FeF_aS_bO_c$ where $1 \leq a \leq 9$; $0 < b \leq 3$; $0 \leq c \leq 2$. In further embodiments, the stoichiometry is given by $1.5 \leq a \leq 5$; $0 < b \leq 2$; $0 \leq c \leq 1$. In still further embodiments, the stoichiometry is given by $2 \leq a \leq 4$; $0 < b \leq 1$; $0 \leq c \leq 0.8$. In some embodiments, the discharged active material contains elemental iron (alone or in an alloy or mixture), lithium fluoride, lithium sulfide, and optionally lithium oxide, where the ratio of iron to fluorine to sulfur to oxygen in the discharged material is given by the ratio 1:a:b:c, where $1 \leq a \leq 9$; $0 < b \leq 3$; $0 \leq c \leq 2$. In further embodiments, the ratio is given by $1.5 \leq a \leq 5$; $0 < b \leq 2$; $0 \leq c \leq 1$. In still further embodiments, the ratio is given by $2 \leq a \leq 4$; $0 < b \leq 1$; $0 \leq c \leq 0.8$.

In one embodiment the metal compound component is $FeF_xS_y$, where x is between about 1 and 9 and y is between about 0 and 3. In one embodiment the metal compound component is $CuF_xS_y$, where x is between about 1 and 3 and y is between about 0 and 2. In one embodiment the metal compound component is $CoF_xS_y$, where x is between about 1 and 4 and y is between about 0 and 3. In one embodiment the metal compound component is $FeF_1S_1$, $FeF_{1+2x}S_{1-x}$, $CuF_{2x}S_{1-x}$, $CoF_1S_1$, or $CoF_{1+2x}S_{1-x}$.

In various embodiments, the iron-sulfur-fluorine fully charged active materials described herein are single compounds, having a defined morphology, which may be crystalline or amorphous. In some cases, the compounds are present in a single phase.

Cathode Ion and Electron Conductors—MEIC, Electronic Conductors, and Ionic Conductors In certain embodiments, the cathode includes a mixed electron-ion conducting component (the "MEIC component") together with an active component as described above. The MEIC component may generally be made of any material or materials that is compatible with the other materials of the device and allows electron and lithium ion transport sufficient for operation of the device. In one embodiment, the MEIC component is a material having an electronic conductivity of $10^{-7}$ S/cm or greater at the device operating temperature. In one embodiment, the MEIC component is a material having a lithium ion conductivity of $10^{-7}$ S/cm or greater at the device operating temperature.

Examples of materials that may be used as the MEIC component include, without limitation, lithium titanates, lithium iron phosphates, vanadium oxides, cobalt oxides, manganese oxides, lithium sulfides, molybdenum sulfides, iron sulfides, LiPON, $MoO_3$, $V_2O_5$, carbon, copper oxides, lithium insertion compounds such as $LiCoO_2$, $Li(CoMn)O_2$, $LiMn_2O_4$, $Li(CoNiMn)O_2$, $Li(NiCoAl)O_2$, or other materials having relatively high lithium ion conductivity. In one embodiment, the MEIC component is made of the same material as that of a solid state electrolyte used in battery containing the cathode. In one embodiment, the MEIC component is made of a different material than that of the solid state electrolyte. The MEIC component may itself possess electrochemical activity (for example $MoO_3$, $MoS_2$, or $V_2O_5$) or may not show electrochemical activity (for example LiPON). In one embodiment, the MEIC is LiPON.

If the cathode includes an MEIC component, the minimum amount of MEIC component will generally be the amount that allows sufficient lithium ion and electron transport for functioning of the device. The maximum amount may be that amount of MEIC that provides an electrochemically active cathode material with the required specific capacity or other electrical characteristics when operating at required rates, voltage windows, and states of charge. In one embodiment of the devices including an MEIC, the minimum amount of MEIC is about 1% by weight of the cathode material. In one embodiment of the devices including an MEIC, the minimum amount of MEIC is about 5% by weight of the cathode material. In one embodiment of the devices including an MEIC, the maximum amount of MEIC is about 50% by weight of the cathode material. In one embodiment of the devices including an MEIC, the maximum amount of MEIC is about 25% by weight of the cathode material.

The MEIC material may be provided in the electrode in various forms. In one example, small particles of MEIC are mixed with the electrochemically active particles and compressed. In another example, the MEIC coats the active material particles. In yet another example, the MEIC arrays into vertical wires. The MEIC may include at least two materials, one having high electron conductivity and another having high ionic conductivity.

In certain embodiments, the cathode includes an electron conductor dispersed to increase the electron conductivity of the electrode. In some embodiments, the component has an electron conductivity above $10^{-7}$ S/cm. This electron conductor may be a carbon or metal compound in some embodiments. Examples of forms of carbon that may be employed include graphite, activated carbon, nanotubes, nanofibers, nanowires, graphene, graphene oxide, etc. When present, an electron conductor may be present in an amount of about 20% by weight or less of the active material in the cathode or about 10% by weight or less. Examples of such material may be nanowires, nanoparticles, nanocrystals, and may be oriented in the direction from the electrode to the electrolyte or may be randomly or semi-randomly dispersed. In certain embodiments, the material forms a percolating network throughout the cathode.

In some implementations, the cathode includes a lithium ion ionic conductor dispersed to increase the ion conductivity of the electrode. Example materials may be nanowires, nanoparticles, nanocrystals, and may be oriented in the direction from the electrode to the electrolyte or may be randomly dispersed. The ion material may be formed in coatings around the active material particles. The material may form a percolating network throughout the cathode. In certain embodiments, the material has an ion conductivity of at least $10^{-7}$ S/cm at the operating temperature of a device incorporating the cathode. In some embodiments, the material has an ion conductivity of at least $10^{-5}$ S/cm, or an ion conductivity of greater than $10^{-4}$ S/cm. Materials with this lithium ion conductivity are known in the art; a non-limiting list includes lithium iron phosphate, carbon, $Li_2O$—$SiO_2$—$ZrO_2$, Li—Al—Ti—P—O—N, $LiMO_2$, $Li_{10}GeP_2S_{12}$, $Li_{1.5}Al_{0.5}Ge_{1.5}(PO_4)_3$, $Li_7La_3Zr_2O_{12}$, $Li_9SiAlO_8$, $Li_3Nd_3Te_2O_{12}$, $Li_5La_3M_2O_{12}$ (M=Nb,Ta), $Li_{5+x}M_xLa_{3-x}Ta_2O_{12}$ (M=Ca, Sr, Ba), LiPON, lithium sulfide, garnets, antiperovskites, lithium iron sulfide, iron sulfide, lithium phosphate, Lisicon, thio-lisicon, glassy structures, lanthanum lithium titanate, garnet structures, β" alumina, and lithium solid electrolytes. The ion conductor may be an electrolyte material such as a liquid, gel, polymer, or room temperature ionic liquid. In some cases, the material has an ion conductivity of at least greater than the electrolyte. The ion conductor is preferably present in amounts of about 20% by weight or less of the active material in the cathode or about 10% by weight or less.

In some implementations, the cathode is a thin film containing the active component and, optionally, a MEIC component, an electron conductor component, and/or an ion conductor component. The cathode may further include a binder component to enhance adhesion and cohesion. Any active material, MEIC component, electron conductor, and/or ion conductor described herein may be used. The thin film may be a continuous layer such as one deposited by sputtering or evaporation. The continuous thin film may include a matrix with embedded particles such as iron metal particles, iron fluoride sulfide particles, lithium fluoride and lithium sulfide particles, etc., which vary in composition over discharge and charge. Alternatively, the cathode may be a layer that includes particles and is optionally held together by a binder. Binder materials are well known in the battery industry; suitable choices include PVdF, PVdF-HFP, polypropylene, and SBR. In one embodiment, the thin film cathode has a thickness of between about 2.5 and 500 nm. In another embodiment the thin film cathode has a thickness of between about 5 and 300 nm. In another embodiment the thin film cathode has a thickness of about 200 nm or greater.

Cathode Physical Structure—Metal Compound Particles

For devices in which the cathode includes a metal compound component and an optional MEIC, the cathode may contain the optional MEIC and particles of the metal compound component. The particles containing the metal compound component may generally be of any shape and size. In one embodiment, at least some of the particles containing the metal component are approximately spherical. However, they may be other shapes as well, such as rods, wires, pillows, polygons, flakes, and combinations of any of these, with or without spheres. As used herein, "approximately spherical" means that none of the three linear dimensions of the particle has a characteristic length that is more than twice the characteristic length of either of the other two dimensions. It should be understood that the approximately spherical particles described below can be substituted with non-spherical particles. In such cases, the recited "diameter" may be viewed as a characteristic dimension of the particles, which characteristic dimension is the shortest path across a particle.

In one embodiment, at least some of the nanocrystals or primary particles containing the metal compound component are approximately spherical and such particles have a median diameter of between about 1 and 20 nm. In one embodiment, at least some of the particles containing the metal compound component are approximately spherical and such particles have a median diameter of between about 3 and 10 nm, or between about 1 and 5 nm.

In one embodiment, metal compound component includes particles of iron sulfur fluoride. In one embodiment, the metal compound component includes particles of iron sulfur fluoride, at least some of which are approximately spherical and such spherical particles have a median diameter of between about 1 and 20 nm, or between about 3 and 10 nm, or between about 1 and 5 nm.

In one embodiment, metal compound component includes particles of copper sulfur fluoride. In one embodiment, the metal compound component includes particles of copper sulfur fluoride at least some of which are approximately spherical and such spherical particles have a median diameter of between about 1 and 20 nm, or between about 3 and 10 nm, or between about 1 and 5 nm.

In one embodiment, metal compound component includes particles of cobalt sulfur fluoride. In one embodiment, the metal compound component includes particles of cobalt sulfur fluoride at least some of which are approximately spherical and such spherical particles have a median diameter of between about 1 and 20 nm, or between about 3 and 10 nm, or between about 1 and 5 nm.

In one embodiment, the metal compound component includes particles of manganese sulfur fluoride at least some of which are approximately spherical and such spherical particles have a median diameter of between about 1 and 20 nm, or 3 and 10 nm, or between about 1 and nm.

In one embodiment, the cathode includes an MEIC component and particles of a metal compound component embedded in a matrix of the MEIC component. The particles of the metal compound component may be as described above.

Cathode Physical Structure—Metal Particles and Lithium Compound Particles

For cathodes in which at some state of charge the active material includes a metal component, one or more lithium compound components (e.g., LiF, Li$_2$S, and optionally Li$_2$O), and an optional conductivity enhancing agent such as a MEIC, in one embodiment the cathode contains the optional MEIC and particles of the metal component and particles of the lithium compound component(s). The particles of the metal component and the particles of the lithium compound components may generally be of any shape and size. Such active material may include some particles containing only metal and other particles containing only lithium compounds (rather than particles containing both metal and lithium compounds). In other embodiments, some or all of the particles contain both the metal and lithium compounds. Unless stated otherwise herein, the particles may be either homogeneous (containing only metal, lithium compounds or other material) or heterogeneous containing two more materials in a single particle (e.g., containing both metal and lithium compounds in a particle).

In one embodiment, at least some of the nanocrystals or primary particles of the metal component are approximately spherical. In one embodiment, at least some of the particles of the metal component are approximately spherical and such particles have a median diameter of between 1 and 20 nm, or between about 2 and 10 nm.

In one embodiment, the metal component contains particles of iron. In one embodiment, the metal component contains particles of iron at least some of which are approximately spherical and such spherical particles have a median diameter of between about 1 and 20 nm, or between about 2 and 10 nm, or between about 1 and 5 nm.

In one embodiment, the metal component contains particles of copper. In one embodiment, the metal component contains particles of copper at least some of which are approximately spherical and such spherical particles have a median diameter of between about 1 and 20 nm, or between about 2 and 10 nm, or between about 1 and 5 nm.

In one embodiment, the metal component contains particles of cobalt. In one embodiment, the metal component contains particles of cobalt at least some of which are approximately spherical and such spherical particles have a median diameter of between about 1 and 20 nm, or between about 2 and 10 nm, or between about 1 and 5 nm. In some embodiments, the metal component particles may have other shapes such as rods, wires, pillows, polygons, flakes, and combinations of any of these, with or without spheres. Any such particles can possess a characteristic dimension in the ranges identified here as diameters.

In one embodiment, at least some of the particles of the lithium compound components are approximately spherical. In one embodiment, at least some of the particles of the lithium compound components are approximately spherical and such particles have a median diameter of between about 1 and 20 nm, or between about 1 and 10 nm, or between about 1 and 5 nm.

In one embodiment, the lithium compound component contains particles of lithium halide (e.g., lithium fluoride), lithium chalcogenide (e.g., lithium sulfide), and optionally lithium oxide. In one embodiment, the lithium compound component contains particles of lithium fluoride and lithium sulfide at least some of which are approximately spherical and such spherical particles have a median diameter of between about 1 and 20 nm, or between about 2 and 10 nm, or between about 1 and 5 nm. In some embodiments, the lithium compound particles may have other shapes such as rods, wires, pillows, polygons, flakes, and combinations of any of these, with or without spheres. Any such particles can possess a characteristic dimension in the ranges identified here as diameters.

When multiple lithium compounds are present in the cathode, they may exist as separate particles. For example, the electrode may include particles of lithium sulfide and lithium fluoride. In other embodiments, two or more lithium compounds are intimately mixed in single particles.

In certain embodiments, the cathode includes an optional MEIC component, particles of iron and particles of lithium fluoride and iron sulfide. In one embodiment, at least some of the iron particles are approximately spherical and such particles have a median diameter of between about 1 and 20 nm, or between about 3 and 10 nm, or between about 1 and 5 nm. In some of these embodiments, at least some of the lithium fluoride and lithium sulfide particles are approximately spherical and such particles have a median diameter of between about 1 and 20 nm. In some embodiments, the iron and/or lithium fluoride and iron sulfide particles may have other shapes such as rods, wires, pillows, polygons, flakes, and combinations of any of these, with or without spheres. Any such particles can possess a characteristic dimension in the ranges identified here as diameters.

In one embodiment, the cathode includes an optional MEIC component, particles of copper and particles of lithium fluoride and lithium sulfide. In one embodiment of this device, at least some of the copper particles are approximately spherical and such particles have a median diameter of between about 1 and 20 nm, or between about 2 and 10 nm, or between about 1 and 5 nm. In some embodiments, the copper particles may have other shapes such as rods, wires, pillows, polygons, flakes, and combinations of any of these, with or without spheres. Any such particles can possess a characteristic dimension in the ranges identified here as diameters.

In one embodiment, the cathode includes an optional MEIC component, particles of cobalt and particles of lithium fluoride and lithium sulfide. In one embodiment of this device, at least some of the cobalt particles are approximately spherical and such particles have a median diameter of between about 1 and 20 nm, or between about 2 and 10 nm, or between about 1 and 5 nm. In some embodiments, the cobalt particles may have other shapes such as rods, wires, pillows, polygons, flakes, and combinations of any of these, with or without spheres. Any such particles can possess a characteristic dimension in the ranges identified here as diameters.

In one embodiment in which the cathode includes a metal component and lithium compound components and an optional MEIC component, the cathode contains an optional MEIC component and particles of the metal component embedded in a matrix of the lithium compound components. In one embodiment, at least some of the particles of the metal component are approximately spherical. In one embodiment, at least some of the particles of the metal component are approximately spherical and such particles have a median diameter of between about 1 and 20 nm, or between about 2 and 10 nm, or between about 1 and 5 nm. In some embodiments, the metal component particles may have other shapes such as rods, wires, pillows, polygons, flakes, and combinations of any of these, with or without spheres. Any such particles can possess a characteristic dimension in the ranges identified here as diameters.

In one embodiment, the cathode includes an optional MEIC component, particles of iron and a matrix of lithium fluoride and lithium sulfide. In one embodiment of this device, at least some of the iron particles are approximately spherical and such particles have a median diameter of between about 1 and 20 nm, or between about 2 and 10 nm, or between about 1 and 5 nm. In some embodiments, the iron particles may have other shapes such as rods, wires, pillows, polygons, flakes, and combinations of any of these, with or without spheres. Any such particles can possess a characteristic dimension in the ranges identified here as diameters.

In one embodiment, the cathode includes an optional MEIC component, particles of copper and a matrix of lithium fluoride and lithium sulfide. In one embodiment of this device, at least some of the copper particles are approximately spherical and such particles have a median diameter of between about 1 and 20 nm, or between about 2 and 10 nm, or between about 1 and 5 nm. In some embodiments, the copper particles may have other shapes such as rods, wires, pillows, polygons, flakes, and combinations of any of these, with or without spheres. Any such particles can possess a characteristic dimension in the ranges identified here as diameters.

In one embodiment, the cathode includes an optional MEIC component, particles of cobalt and a matrix of lithium fluoride and lithium sulfide. In one embodiment of this device, at least some of the cobalt particles are approximately spherical and such particles have a median diameter of between about 1 and 20 nm, or between about 2 and 10 nm, or between about 1 and 5 nm. In some embodiments, the cobalt particles may have other shapes such as rods, wires, pillows, polygons, flakes, and combinations of any of these, with or without spheres. Any such particles can possess a characteristic dimension in the ranges identified here as diameters.

In one embodiment in which the cathode includes a metal compound and lithium compound components and an MEIC component, the cathode contains particles of the metal compound and the lithium compound component embedded in a matrix of the MEIC material. In one embodiment, at least some of the particles of the metal compound and/or at least some particles of the lithium compound components are approximately spherical. In one embodiment, at least some of the particles of the metal compound and/or the lithium compounds are approximately spherical and such particles have a median diameter of between about 1 and 20 nm, or between about 2 and 10 nm, or between about 1 and 5 nm. In some embodiments, the metal compound and/or lithium compound particles may have other shapes such as rods, wires, pillows, polygons, flakes, and combinations of any of these, with or without spheres. Any such particles can possess a characteristic dimension in the ranges identified here as diameters.

Cathode Physical Structure—Lithium Metal Compound Particles

For cathodes in which at some state of charge the cathode includes a lithium metal compound component and an optional MEIC, in one embodiment the electrode includes the optional MEIC and particles of the lithium metal compound component. The particles of the lithium metal compound component may generally be of any shape and size.

In one embodiment, at least some of the particles of the lithium metal compound component are approximately spherical. In one embodiment, at least some of the particles of the lithium metal compound component are approximately spherical and such particles have a median diameter of between about 1 and 20 nm, or between about 2 and 10 nm, or between about 1 and 5 nm.

In one embodiment, the lithium metal compound component contains particles of lithium iron sulfur fluoride or lithium copper sulfur fluoride or lithium cobalt sulfur fluoride. In one embodiment, the lithium metal compound component contains particles of lithium iron sulfur fluoride (or lithium copper sulfur fluoride or lithium cobalt sulfur fluoride) at least some of which are approximately spherical and such spherical particles have a median diameter of between about 1 and 20 nm, or between about 2 and 10 nm, or between about 1 and 5 nm.

Electrochemical Characteristics

The cathode active materials disclosed herein may have various electrochemical properties or signatures. Fundamentally, these signatures may be traced to a few material properties. First, the active materials operate at a comparatively high voltage across their entire discharge. Additionally, the materials are good ionic conductors and good electronic conductors. Still further, the materials have a high specific capacity. Collectively, these properties result in cathode materials having a high energy density and very good rate characteristics. These beneficial properties are borne out by the example data presented below.

Conductivity

Generally, the fully charged active material component should be sufficiently conductive, electronically and ionically, to allow ions and electrons to reach the full interior of active material particles in the times allotted for full discharge and full charge. In certain embodiments, the active material has an electron conductivity of at least about $10^{-11}$ S/cm or at least about $10^{-9}$ S/cm, or at least about $10^{-8}$ S/cm. In certain embodiments, the active material has a lithium ion conductivity of at least about $10^{-11}$ S/cm or at least about $10^{-9}$ S/cm, or at least about $10^{-8}$ S/cm.

Voltage

Figure 3:
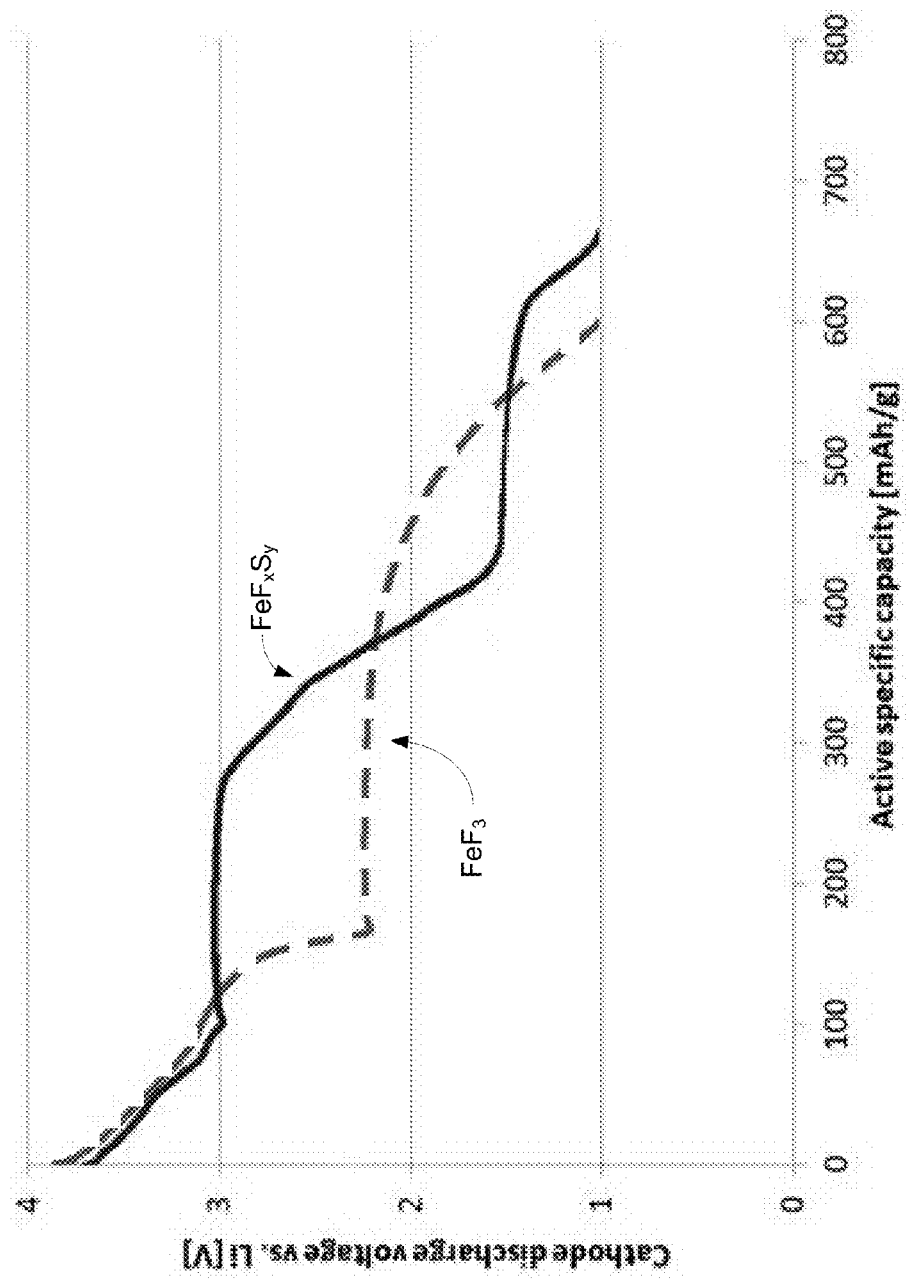
FIG. 3 is a plot comparing voltage and capacity for iron and fluorine materials in accordance with various embodiments.

In certain embodiments, the fully charged active materials have a relatively high voltage over the course of discharge. As a benchmark, such materials may have a higher average discharge voltage than $FeF_3$, when discharged under the same conditions. This result is depicted in FIG. 3 for example. FIG. 3 compares the voltage versus capacity (or state of charge) curves for iron and fluorine containing materials. In the figure, the solid curve is a typical $FeF_xS_y$ compound and the dashed curve is $FeF_3$. The iron, fluorine, and sulfur-containing material has a significantly higher sustained voltage over the course of discharge.

As shown there, the iron fluorine and sulfur containing material has a higher average voltage over the course of discharge than a simple ferric fluoride compound.

In some cases, cathodes fabricated from the active materials of this disclosure have an average discharge voltage of at least about 2V when discharged between 1 and 4.5V versus a standard lithium metal electrode (Li/Li$^+$) at a rate of 400 mA/g and a temperature of 120° C. In some cases, the cathodes have an average discharge voltage of at least about 2.5V when discharged between 1 and 4.5V versus a standard lithium metal electrode (Li/Li$^+$) at a rate of 400 mA/g and a temperature of 120° C. These voltage levels may be maintained for at least about 10 cycles, or at least about 30 cycles, or at least about 50 cycles, or at least about 100 cycles.

In certain embodiments, when electrodes are prepared for a power cell configuration (relatively lower mass loading, higher carbon content, etc.), the average discharge voltage of the active material decreases by at most about 20% when the discharge rate increases from 10 C to 100 C or by at most about 10% when the discharge rate increases from 10 C to 100 C.

As shown in FIG. 3, the voltage remains particularly high during a large initial fraction of the cathode discharge. For example, over the first 300 mAh/g of discharge, the cathode voltage may remain at a level of near 3 V or higher relative to lithium when the electrode is discharged at a rate of 400 mA/g and at a temperature of 120° C. It is believed that this high discharge voltage is not attainable with other cathode active materials that discharge by receiving lithium ions; for example materials that rely on breaking and/or making chemical bonds or those that rely on insertion of lithium ions. In certain embodiments, a cathode active material has a specific capacity of at least about 300 mAh/g at a voltage of at least about 2.9 volts relative to lithium, when charged to a voltage of 3.9 volts relative to lithium and discharged at a rate of 400 mA/g and at a temperature of 120° C. In some cases, such material contains iron, fluorine and sulfur. It may be a compound having the structure $FeF_aS_bO_c$ as defined above. In certain embodiments, the cathode active material has a specific capacity of at least about 500 mAh/g at a voltage of at least about 1 volt relative to lithium, when charged to a voltage of 3.9 volts relative to lithium and discharged at a rate of 400 mA/g and at a temperature of 120° C. In some cases, such material contains iron, fluorine and sulfur. It may be a compound having the structure $FeF_aS_bO_c$ as defined above.

It should be understood that different portions of a discharge curve such as that depicted in FIG. 3 represent likely different reaction stages in the overall discharge mechanism. While not wishing to be bound to any theory or mechanism of action, it is believed that discharge may initially involve insertion of lithium ions in an iron sulfur fluoride active material matrix. This may involve formation of a lithium iron sulfur fluoride from the active material component. As discharge progresses, additional lithium added into this material may produce metallic iron along with lithium fluoride and lithium sulfide. This reaction may result in extrusion of iron.

Specific Capacity

In certain embodiments, the cathode active material provides a specific capacity of greater than about 400 mAh/g (in the following the "g" is understood to refer to grams of active material) when discharged between 1 and 4.5 V versus a lithium metal anode (Li/Li$^+$) at 120° C. with a discharge rate of 400 mA/g. In some cases, the electrode material provides a specific capacity of greater than about 500 mAh/g, or about 600 mAh/g or about 700 mAh/g, in each case the capacity value is for the active material discharged in the voltage range of 1 to 4.5 V versus a lithium metal anode at 120° C. with a discharge rate of 400 mA/g. In some embodiments, the electrode materials described herein provide a specific capacity of between about 350 and 750 mAh/g when discharged between 1 and 4.5 V against a lithium metal anode at 120° C. with a discharge rate of 400 mA/g. These specific capacity levels may be maintained for at least about 10 cycles, or at least about 30 cycles, or at least about 50 cycles, or at least about 100 cycles. In certain embodiments, the specific capacity of the active material decreases by at most about 20% when the discharge rate increases from 10 C to 100 C or decreases by at most about 10% when the discharge rate increases from 10 C to 100 C.

Hysteresis

In some embodiments, cathodes employing the active materials described herein exhibit an average voltage hysteresis of less than about 2V in the voltage range of 1 to 4.5 V versus a lithium metal electrode at 120° C. with a charge/discharge rate of 400 mA/g. In some cases, such electrodes exhibit an average voltage hysteresis of less than about 1.5 V when cycled between 1 and 4.5 V versus a lithium metal electrode at 120° C. with a charge/discharge rate of 400 mA/g. In certain embodiments, the electrodes exhibit an average voltage hysteresis of less than about 1V when cycled between 1 and 4.5 V versus a lithium metal electrode at 120° C. with a charge/discharge rate of 400 mA/g. These hysteresis levels may be maintained for at least about 10 cycles, or at least about 30 cycles, or at least about 50 cycles, or at least about 100 cycles.

Voltage hysteresis is the difference between the discharge voltage and the charge voltage, both varied as a function of state of charge. It represents the inefficiency of the battery—energy lost to heat, often due to sluggishness of either ion transport or reactions. As a result, overvoltages are required to drive the reactions, which cause the discharge voltage to be lower than the open circuit voltage and the charge voltage to be higher than the open circuit voltage. A low hysteresis value indicates that the battery is efficient.

In certain embodiments, the average voltage hysteresis of the active material increases by at most about 40% when the discharge rate increases from 10 C to 100 C or increases by at most about 20% when the discharge rate increases from 10 C to 100 C.

In general, rate performance of a battery or cathode, including discharge voltage, capacity, and hysteresis, will depend on electrode design, anode properties, current collector conductivity, electrolyte conductivity, separator porosity and thickness, operating temperature and a number of other factors. One advantage of the materials described herein is that at certain particle sizes, the materials are capable of sustaining high rate performance. That is, for given values of the various factors listed above, overpotential due to electrochemical reaction, and electron and ion conductivity through the active particle will not dominate the contribution to hysteresis increase when the rate increases significantly, e.g., going from 10 C to 100 C.

Specific Energy

In some embodiments, the cathode materials described herein have a specific energy of at least about 1100 Wh/kg when discharged in the voltage range of 1 to 4.5 V versus a lithium metal electrode at 120° C. with a discharge rate of 400 mA/g. In some cases, such material has a specific energy of at least about 1300 Wh/kg when discharged between 1 and 4.5 V versus a lithium metal electrode at 120° C. with a discharge rate of 400 mA/g. In certain embodiments, the material has a specific energy of at least about 1500 Wh/kg when discharged between 1 and 4.5 V versus a lithium metal electrode at 120° C. with a discharge rate of 400 mA/g. At aggressive electrode and cell design (high mass loading, low carbon and porosity content, etc.), the energy density in the active material is sufficient to enable an energy density of over 500 Wh/kg and over 1200 Wh/L at the cell level. This level of specific energy may be maintained for at least about 10 cycles, or at least about 30 cycles, or at least about 50 cycles, or at least about 100 cycles. In certain embodiments, the cathode specific energy decreases by at most about 10% when the discharge rate increases from 10 C to 100 C or decreases by at most about 20% when the discharge rate increases from 10 C to 100 C.

As suggested in FIG. 3, an electrode's specific energy remains particularly high during a large initial fraction of discharge. It is believed that this high initial specific energy is not attainable with other cathode active materials that discharge by receiving lithium ions; for example materials that rely on breaking and/or making chemical bonds or those that rely on insertion of lithium ions. In certain embodiments, the cathode active material has a specific energy of at least about 600 mWh/g at a voltage of at least about 2.9 volts relative to lithium, when charged to a voltage of 3.9 volts relative to lithium and discharged at a rate of 400 mA/g and at a temperature of 120° C. In some cases, such material contains iron, fluorine and sulfur. It may be a compound having the structure $FeF_aS_bO_c$ as defined above. In certain embodiments, the cathode active material has a specific energy of at least about 1000 mWh/g at a voltage of at least about 1 volt relative to lithium, when charged to a voltage of 3.9 volts relative to lithium and discharged at a rate of 400 mA/g and at a temperature of 120° C. In some cases, such material contains iron, fluorine and sulfur. It may be a compound having the structure $FeF_aS_bO_c$ as defined above.

Energy Efficiency

In some embodiments, electrodes employing the cathode materials described herein possess an energy efficiency of at least about 65% when cycled in the voltage range of 1 to 4.5 V versus a lithium metal electrode at 120° C. with a charge/discharge rate of 400 mA/g. In some cases, such electrodes possess an energy efficiency of at least about 70% when cycled between 1 and 4.5 V versus a lithium metal electrode at 120° C. with a charge/discharge rate of 400 mA/g. In certain embodiments, the electrodes possess an energy efficiency of at least about 75% when cycled between 1 and 4.5 V versus a lithium metal electrode at 120° C. with a charge/discharge rate of 400 mA/g. This level of energy efficiency may be maintained for at least about 10 cycles, or at least about 30 cycles, or at least about 50 cycles, or at least about 100 cycles. In some implementations, the energy efficiency decreases by at most about 40% when the discharge rate increases from 10 C to 100 C or decreases by at most about 2% when the discharge rate increases from 10 C to 100 C.

Energy efficiency represents the energy generated during discharge divided by the energy consumed during charge. Energy efficiency should be distinguished from charge efficiency, which is simply the number of coulombs that pass over discharge divided by the number of coulombs that pass during charge. The energy efficiency represents the fraction of the charge energy available to do work on discharge; i.e., the fraction of charge energy that is not lost to heating, parasitic reactions, etc. The concept of energy efficiency is closely related hysteresis. While hysteresis represents the average voltage difference between charge and discharge in a voltage versus capacity plot, energy efficiency represents a ratio of the area in such plot below the charge curve to the area beneath the discharge curve, the two voltage curves that define hysteresis.

Energy Density

In some embodiments, the cathode materials described herein have an energy density of at least about 2000 Wh/L when discharged in the voltage range of 1 to 4.5 V versus a lithium metal electrode at 120° C. with a discharge rate of 400 mA/g. In some cases, such materials have an energy density of at least about 2750 Wh/L when discharged between 1 and 4.5 V versus a lithium metal electrode at 120° C. with a discharge rate of 400 mA/g. In certain embodiments, the materials have an energy density of at least about 3250 Wh/L when discharged between 1 and 4.5 V versus a lithium metal electrode at 120° C. with a discharge rate of 400 mA/g. This level of specific energy may be maintained for at least about 10 cycles, or at least about 30 cycles, or at least about 50 cycles, or at least about 100 cycles. In certain embodiments, the cathode specific energy decreases by at most about 40% when the discharge rate increases from 10 C to 100 C or decreases by at most about 20% when the discharge rate increases from 10 C to 100 C.

In certain embodiments, depending on the formulation of the iron sulfur fluoride compound, a 1 C discharge rate corresponds to around 600 mA/g. The capacity of the material may be as high as 500 to 700 mAh/g, so the 1 C rate would be about 500 to 700 mA/g.

Battery Cell Design and Applications

In some aspects of this disclosure, a solid state battery cell is used having a cathode as described above. Some examples of cells of suitable construction are presented in U.S. Provisional Patent Application No. 61/674,961 filed Jul. 24, 2012, and U.S. Provisional Patent Application No. 61/707, 405 filed Sep. 28, 2012, both of which are incorporated herein by reference in their entireties. In various embodiments, the cell includes (a) a cathode as described herein; (b) a solid electrolyte; and (c) an anode including lithium metal or reversibly available lithium ions. The cathode may have an electrochemically active material component as described above in terms of composition, physical structure, morphology, etc. The cathode may additionally include one or more other components such as an ion conductor, electron conductor, and/or MEIC of the types described elsewhere herein. The cathode may additionally contain a binder such as a fluorinated polymer (e.g., polytetrafluoroethylene, polyvinylidene fluoride, etc.). The ratios of cathode components may be as described elsewhere herein. The thickness of the cathode may be as described elsewhere herein.

Figure 4A:
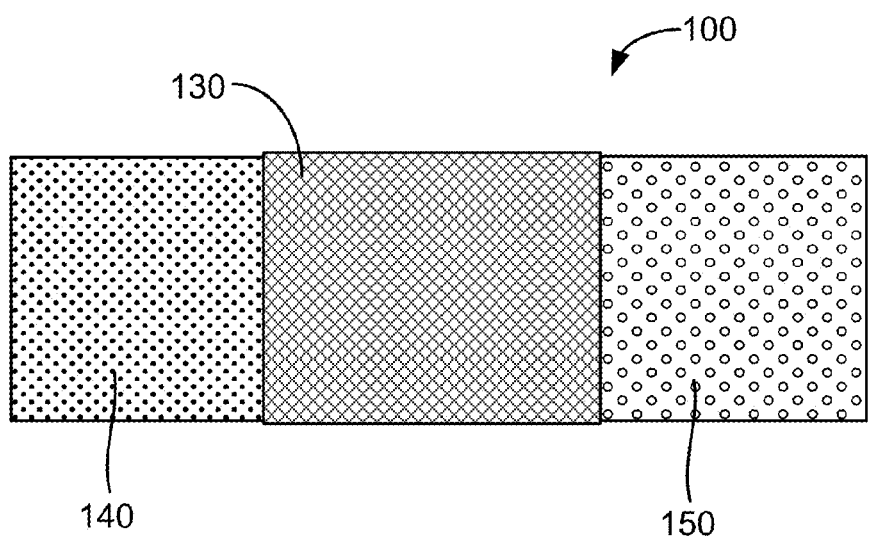
FIGS. 4A and 4B are schematic illustrations of solid-state energy storage devices in accordance with various embodiments.

FIG. 4a shows one embodiment of a solid-state energy storage device described herein. The device (100) includes an anode (140) and cathode (150) spaced apart and a solid-state electrolyte (130) disposed between the anode and cathode.

Figure 4B:
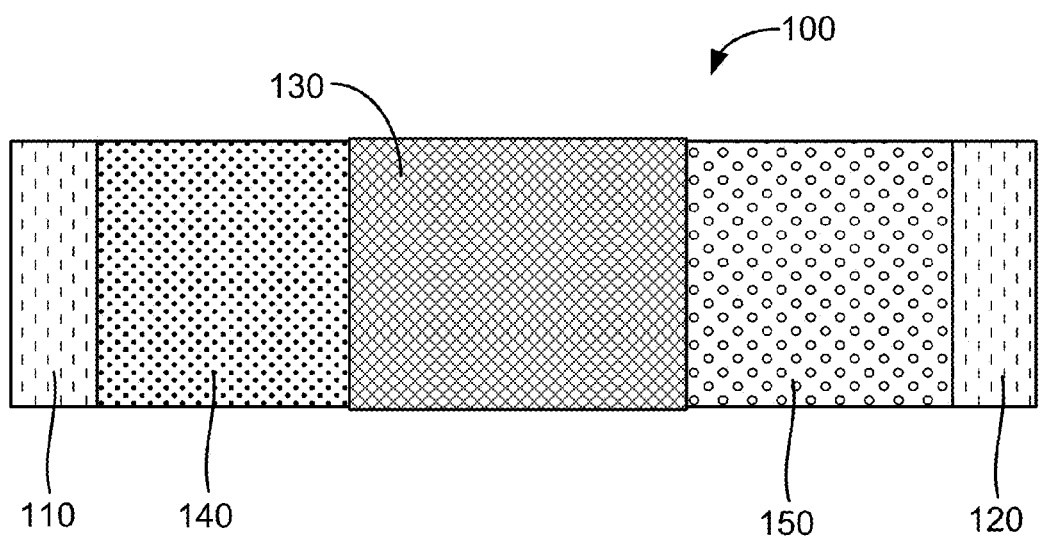

FIG. 4b shows an embodiment of a solid-state energy storage device with an anode current collector (110) proximate to the anode and a cathode current collector (120) proximate to the cathode. Generally, the current collector is a solid conductive substrate in intimate contact with the electrochemically active material of electrode. Forms of current collectors include sheets, foils, foams, meshes, perforated sheets, etc. The current collector should be made from a conductive material that is electrochemically compatible with the cathode material. Examples include copper, aluminum, nickel, tungsten, titanium, tantalum, molybdenum, tantalum nitride, and titanium nitride, steel, stainless steel, and alloys or mixtures thereof.

Figure 5:
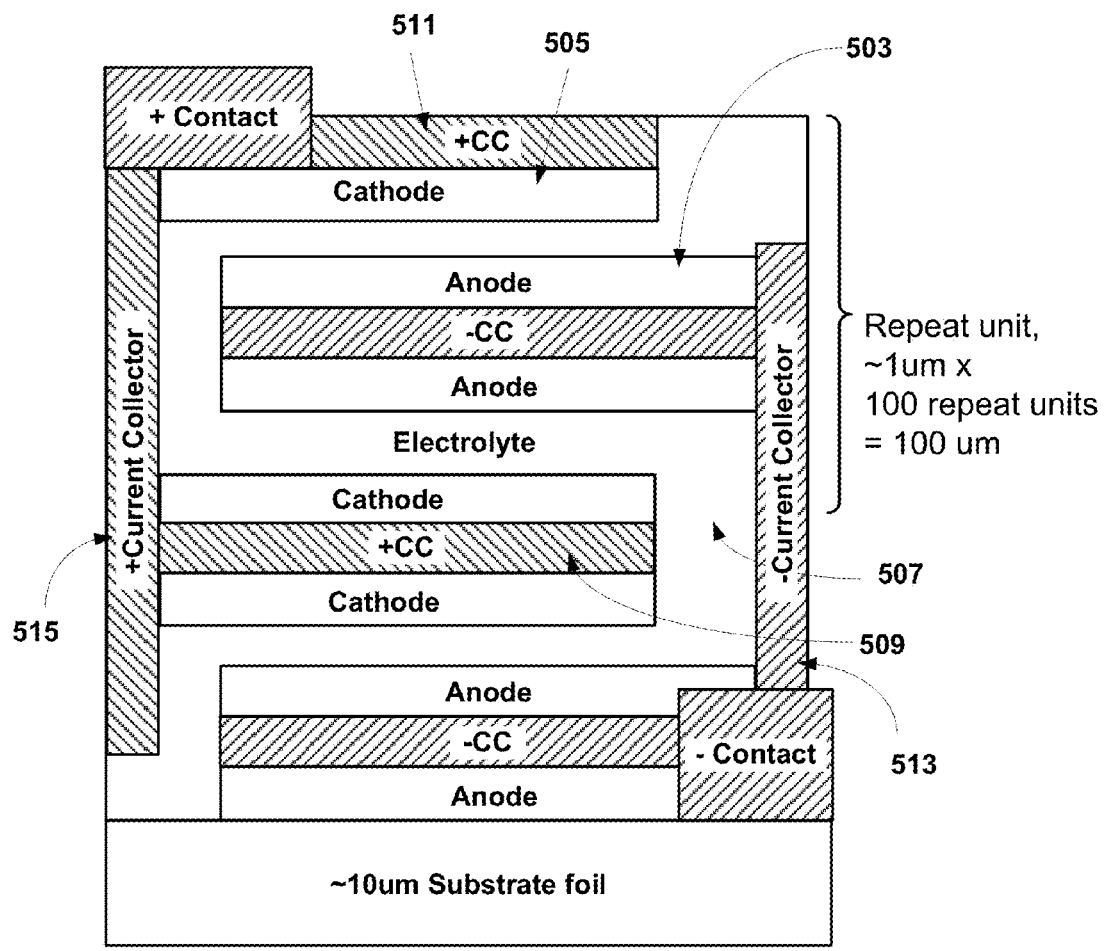
FIG. 5 is an example of a small multi-stack battery.

FIG. 5 presents an example of a small multi-stack battery configuration. While the depicted device shows only two anodes 503 and two cathodes 505, the concept is readily extendable to designs having more, and often many negative and cathodes; for instance 100 layers of anode/electrolyte/cathode, each layer on the order of a 100 nm-100 μm thick.

The anodes 503, cathodes 505, and electrolyte 507 may have compositions, properties, and/or morphologies disclosed above.

Note that there is a current collector disposed between two layers of active material in each electrode. These current collectors (509 and 511) are horizontally oriented in the depicted embodiment. These individual electrode current collectors are electrically connected to a bus or vertical current collector (513 and 515) as depicted in the figure. Solid electrolyte not only separates adjacent negative and cathodes but also separates the electrodes from the vertical current collectors of the opposite polarity.

As used herein, a solid-state energy storage device means an energy storage device that includes a solid state anode, a solid state cathode, a solid state electrolyte and other optional components, but does not include any non-solid components that function as an anode, a cathode or an electrolyte.

Electrolyte

The solid electrolyte is provided as a layer between and electronically separating the positive and anodes. In certain implementations, the layer of solid electrolyte has a thickness of between about 10 nm and 50 μm. In certain implementations, the layer of solid electrolyte has a thickness of between about 100 nm and 10 μm.

The solid state electrolyte may generally be made of any material that is compatible with the other materials of the device, which has a lithium ion conductivity large enough to allow passage of lithium ions for functioning of the device and has an electronic conductivity small enough for functioning of the device. In some examples, the electrolyte material has a relatively high lithium ion conductivity, e.g., at least about $10^{-7}$ S/cm at 100° C., or at least about $10^{-6}$ S/cm at 100° C., or at least about $10^{-5}$ S/cm at 100° C., or at least about $10^{-4}$ S/cm at 100° C., or at least about $10^{-3}$ S/cm. In one embodiment the solid state electrolyte has an electronic conductivity of at most about $10^{-10}$ S/cm at 100 degrees celcius.

In some embodiments, the solid state electrolyte is or contains a material selected from LiPON, lithium aluminum fluoride, $Li_3OCl$, $Li_2O$—$SiO_2$—$ZrO_2$, Li—Al—Ti—P—O—N, $Li_{3x}La_{2/3-x}TiO_3$, $Li_{10}GeP_2S_{12}$, $Li_{1.5}Al_{0.5}Ge_{1.5}(PO_4)_3$, $Li_7La_3Zr_2O_{12}$, $Li_9SiAlO_8$, $Li_3Nd_3Te_2O_{12}$, $Li_5La_3M_2O_{12}$ (M=Nb,Ta), $Li_{5+x}M_xLa_{3-x}Ta_2O_{12}$ (M=Ca, Sr, Ba), LiPON, lithium phosphate, Lisicon, thio-lisicon, $Li_2S$—X (X=$SiS_2$, $GeS_2$, $P_2S_5$, $B_2S_3$, $As_2S_3$), $Li_aAl_bGa_cB_dS_e(PO_4)_f$, $Li_aAl_bGa_cB_dS_e(BO_3)_f$, $Li_aGe_bSi_cS_d(PO_4)_e$, $Li_aGe_bSi_cS_d(BO_3)_e$, glassy structures, lanthanum lithium titanate, garnet structures, β" alumina, and other lithium solid electrolytes. In one embodiment, the solid state electrolyte is LiPON. In one embodiment, the solid state electrolyte is a lithium aluminum fluoride. In certain embodiments, the solid state electrolyte is $LiAlF_4$.

In some embodiments, the solid state electrolyte contains an anti-perovskite compound such as a compound of the formula $Li_3OX$, where X is a halide such as fluoride, chloride, iodide, or bromide. In some embodiments, the antiperovskite is an antiperovskite hydrate. In some embodiments, the solid state electrolyte contains a compound based on a different crystal structure such as an anti-fluorite, anti-brown millerite, or anti-$K_2MgF_4$ lattice. In some cases, a variant of an anti-perovskite or other lattice is employed. Such variants include anti-perovskite, anti-fluorite, anti-brown millerite, or anti-$K_2MgF_4$ lattices having anion vacancies or aliovalent doping. As examples, the variants may include oxygen or other anion vacancies, substitutions of oxygen atoms for halogen atoms, or other variations that reduce the concentration of negative valence in the composition. In certain embodiments, the solid electrolyte has a composition as described in U.S. Provisional Patent Application No. 61/717,517 filed Oct. 23, 2012, which is incorporated herein by reference in its entirety.

In other embodiments, the electrolyte is a solid polymer material. In certain embodiments, a liquid, ionic liquid or gel electrolyte is used without a solid state electrolyte. Such electrolyte may be any of the types employed with conventional lithium ion cells.

Anode

The negative electrode or anode may generally be made of any material that is compatible with the other materials of the device and which may store lithium atoms or ions when the device is in the charged state and may provide lithium ions for incorporation into the cathode when the device is in the discharged state. In one embodiment of the devices the anode active material is lithium metal. In one embodiment of the devices the anode material is a lithium silicide. In one embodiment of the devices, the anode active material is lithium intercalated into a carbon component, such as graphite. In some cases, the anode active material is a material capable of inserting lithium ions at a higher reversible capacity than carbon. Such high capacity materials include tin, magnesium, germanium, silicon, oxides of these materials and the like.

In one embodiment of the electrochemical cells, the anode material is a porous material that allows lithium plating into the pores, thereby relieving the swelling stress that would otherwise result on the electrolyte by anode swelling as a result of lithium plating. In one embodiment, the pores are carbon nanotubes, carbon buckyballs, carbon fibers, activated carbon, graphite, porous silicon, aerogels, zeolites, xerogels, etc.

In one embodiment of the cells, the anode is formed in situ during the first charge cycle of the battery. In case the device is fabricated in the discharged state (with a lithiated cathode), the first charge cycle will extract the lithium from the cathode and deposit it on the anode side. In the case where the anode is a lithium metal anode, the anode is therefore formed in situ by plating on the negative current collector. In this case, the negative current collector may be a metal that does not alloy with or react with lithium; a non-limiting list of possible choices for negative current collector metal includes TaN, TiN, Cu, Fe, stainless steel, steel, W, Ni, Mo, or alloys thereof. In one embodiment, there is an excess of lithium in the device as fabricated on the cathode side. In another embodiment, there is an excess of lithium in the device as fabricated on the anode side, possibly in the negative current collector. As a non-limiting example, a lithium foil may be employed, or lithium particles as stabilized lithium metal powder. An excess of lithium is desirable to prolong the cycle life of the battery, as some lithium will inevitably be lost due to side reactions, alloying with current collectors, or in reactions with air and/or water that leak into the device.

In one embodiment of the devices, there is an encapsulation that substantially prevents ingress of air and water into the active materials. The encapsulation may be LiPON, an oxide, nitride, oxynitride, resin, epoxy, polymer, parylene, metals such as Ti or Al, or multilayer combinations thereof. Moisture and oxygen barriers are known in food packaging, semiconductor packaging, etc.

In certain embodiments, the thickness of the active material layer in the anode varies as a function of state of charge between about 0 and ~30 μm. Of course, this thickness depends on cell design.

Current Collectors

The devices described herein include optional positive and/or negative electrode current collectors. The current collectors generally may be made of any material capable of delivering electrons to the negative electrode or the cathode from the external circuit or delivering electrons to the external circuit from the anode and cathode. In one embodiment the current collectors are made of a highly electronically conductive material such as a metal. In one embodiment, the device does not include a positive current collector and electrons are transferred to and from the cathode directly to the external circuit. In one embodiment, the device does not include an negative current collector and electrons are transferred to and from the anode directly to the external circuit. In one embodiment, the device does not include either a positive current collector or an negative current collector. In one embodiment the positive current collector is copper. In one embodiment the current collector is a copper alloy. In one embodiment, the current collector is copper alloyed with a metal selected from nickel, zinc and aluminum. In one embodiment the current collector is copper and also includes a layer of carbon and/or a non-copper metal disposed between the copper and the cathode or anode material. In one embodiment the current collector is copper and also includes a layer of nickel, zinc or aluminum disposed between the copper and the cathode or anode material. In one embodiment, the current collector is aluminum. In one embodiment, the current collector is an aluminum alloy. In one embodiment, the current collector is aluminum and also includes a layer of carbon and/or a non-aluminum metal disposed between the copper and the cathode or anode material. In one embodiment, the current collector is steel or stainless steel. In one embodiment, the current collector is steel or stainless steel and also includes a layer of a non-steel metal disposed between the steel and the cathode or anode material. In another embodiment, the current collector is a polymer substrate such as polyimide, optionally coated with a conductive overlayer such as aluminum, copper, or otherwise. The positive current collector and negative current collector may be different materials chosen among those enumerated above or otherwise.

Energy Density or Specific Energy

In one embodiment, a device as described herein has an energy density of at least about 50 Whr/kg or between about 50 and 1000 Whr/kg when measured at a temperature of 100 degrees Celsius when cycled between 1 and 4V vs. Li and at a current rate of at least about 200 mA/g of cathode active material. In another embodiment, a device as described herein has an energy density of between about 100 and 750 Whr/kg when operated at the above conditions. In another embodiment, a device as described herein has an energy density of between about 250 and 650 Whr/kg when operated at the above conditions. In another embodiment, a device as described herein has an energy density of greater than about 250 Whr/kg when operated at the above conditions. As used herein, energy density is the energy density at the device level; i.e., the total energy stored in the device divided by the mass of the device, where the mass of the device includes the mass of the anode, cathode, electrolyte, current collectors and packaging of the device. From a volumetric perspective, in certain embodiments, the device has an energy density of at least about 600 Wh/L under the conditions set forth above. In certain embodiments, a cell level device has an energy density of at least about 500 Wh/kg or 1200 Wh/L.

In one embodiment, a cathode as described herein has an electrode energy density of between about 500 and 2500 Whr/kg when measured at a temperature of 100 degrees, a 1 C discharge rate, and discharged from 4.5V to 1V vs. Li. In another embodiment, a cathode as described herein has an electrode energy density of between about 800 and 1750 Whr/kg when measured at a temperature of 100 degrees. In another embodiment, a cathode as described herein has an energy density of between about 1000 and 1600 Whr/kg when measured at a temperature of 100 degrees. In another embodiment, a cathode as described herein has an energy density of greater than about 1000 Whr/kg when measured at a temperature of 100 degrees. As used herein, electrode energy density is the energy density at the electrode level; i.e., the total energy stored in the device divided by the mass of the cathode in the discharged state, where the mass of the electrode includes the mass of the electrochemically active material, lithium, positive current collector, and any electrochemically inactive components in the cathode such as ion or electron conductor additives.

Applications for the Devices

The devices described herein may generally be used in any application requiring energy storage. The devices may be particularly well suited for in applications such as in electric vehicles, hybrid electric vehicles, consumer electronics, medical electronics, and grid storage and regulation.

Cell Construction

The above disclosure presents various elements of a battery including current collectors, anodes, cathodes, and electrolytes. Conventional format battery designs may be employed. These include both cylindrical and prismatic configurations such as those employed in consumer electronics, electric vehicles, medical devices, uninterruptible power supplies, etc. Cylindrical configurations include both jelly roll and button cell configurations. The size and footprint of these batteries may be similar to those of conventional format batteries such as A, AA, AAA, C, 18650, etc.

While the specification has focused primarily on solid state electrolytes, it should be understood that the cathodes disclosed herein may be employed in batteries using liquid and gel electrolytes as well.

In various embodiments, the device is provide with a battery maintenance or battery controller apparatus such as a battery charger and associated circuitry for controlling discharge and/or charge parameters such as cut off voltages, cut off capacities, current, temperature, and the like.

Fabrication Methods

The active materials described herein may be fabricated in a charged or discharged state. Various techniques may be employed to fabricate the materials used in the electrodes disclosed herein. Such techniques include vacuum processes such as physical vapor deposition and chemical vapor deposition, wet synthesis, dry synthesis, top-down methods, and coating methods.

One embodiment employs sputtering from each of three or more separate targets. For example, one target may contain metallic iron, another target may contain lithium fluoride, and a third target may contain sulfur in the form of lithium sulfide or iron sulfide. Sequential sputtering from each of these three targets is performed to form a laminate structure that repeats each of the three layers until a desired total thickness is reached. Each layer may have a thickness on the order of, for example, about 0.5 nanometers. In one example, a 10 nm thick layer of the iron sulfur fluoride active material is fabricated from about 40 repetitions of the deposition from the three targets. In some implementations, each of the targets is provided in a different deposition chamber. In other implementations, two or more of the targets are provided in the same chamber.

Certain parameters may be controlled to deposit the desired thicknesses of each of the individual layers. These include the magnitude and frequency of the RF power used to generate the ions that sputter onto the targets, the temperature of the targets, the pressure in the deposition chamber(s), and the duration of the exposure of the substrate to the sputtered material. These parameters are chosen or adjusted so that the desired mass ratio of the resulting iron sulfur fluoride compound is produced. These mass ratios are chosen to produce an active compound or mixture having the molar ratios or stoichiometries set forth elsewhere herein.

Chemical vapor deposition techniques including atomic layer deposition and the like may be employed to deposit the electrochemically active materials disclosed herein. Melt-spinning, atomization, solid state synthesis, flame pyrolysis or flame synthesis, plasma synthesis, and other techniques may be utilized to make the materials described herein.

Other deposition techniques include those generally known as evaporation techniques. In many evaporation techniques, a precursor material is heated to a temperature at which it has a significant vapor pressure and then allowed to deposit on a substrate to a nanoscale thickness. Such techniques include thermal evaporation, e-beam evaporation, vapor phase deposition, close-space sublimation, etc. To deposit an iron sulfur fluoride compound as described herein, co-evaporation of iron fluoride and a sulfur containing material may be performed so that the three principal components of the material mix in the gas phase before they are deposited on the substrate. In another embodiment, sources of each of the individual components of the composition are separately evaporated and deposited onto the substrate so that the components form distinct layers. By maintaining these layers at sufficiently thin dimensions, and in appropriate mass ratios, the desired compound is formed. Typically, each layer is quite thin, typically on the order of a nanometer or smaller. The mass ratios are chosen to produce an active compound or mixture having the molar ratios or stoichiometries set forth elsewhere herein.

One example of a suitable evaporation technique is vapor transport deposition or flash evaporation. It provides continuous deposition of the desired film material by saturating a carrier gas with a vapor from a subliming source. The saturated mixture is directed over a substrate at a relatively low temperature, resulting in a supersaturation condition and subsequent film growth. In one implementation, a reactor employs a separate powder source for each of the three components. A helium source blows heated helium into the powders which are sublimated and transported into the reactor where, in the vapor phase, the three components mix before being deposited on a cold substrate. In an appropriately designed apparatus, each of the powders is provided via a separate tube, and during transport through the tube, the powder is vaporized by the hot helium or other carrier gas. Appropriate precursors for an $FeLi_aF_bS_c$ compound may include iron nanoparticles, iron (II) fluoride, iron (III) fluoride, iron sulfide ($FeS_2$ as pyrite or marcasite, or FeS), stainless steel, lithium metal, lithium fluoride, lithium sulfide, solid sulfur, or vapor phase precursors such as $F_2$, $H_2S$, and $S_{(g)}$.

Another technique for preparing the cathode composition is through the use of a solvent that is evaporated or otherwise induced to precipitate a compound of appropriate composition. As an example, the solvent may be water, ethanol, methanol, THF, $CS_2$ or hydrazine. As an example, the source of iron may be a soluble ferric compound such as ferric nitrate ($Fe(NO_3)_3$), $FeCl_3$, $Fe(ClO_4)_2$, $FeF_3 \cdot xH_2O$ or $FeCl_2$. As an example, the source of fluorine may be ammonium acid fluoride ($NH_4HF_2$). As an example, the source of sulfur may be thiourea ($CS(NH_2)_2$). To introduce oxygen, water may be added to the solution, or a post-anneal in oxygen or atmosphere may be performed. Typically, the precipitated material is treated to remove excess solvent and inactive components such as nitrogen, carbon, and hydrogen. This may be accomplished by heating the precipitate. Acids or bases may be added to the solution to control the pH and therefore control precipitation. Suitable materials include ammonia. In some embodiments, the electrode material is formed directly on a current collecting substrate.

In certain embodiments, after the composition is precipitated, it is post-treated with a sulfur-containing source such as sulfur or hydrogen sulfide in order to introduce sulfur into the composition. To accelerate the rate of sulfur incorporation, the process may be performed in a reducing atmosphere including hydrogen and/or at elevated temperature. A vapor phase sulfur treatment may be performed before or after electrode coating of the active material, and this may be done in a reducing environment. Similarly, the composition may be post-treated with a gas that introduces more fluorine, for example, $NF_3$, $CF_4$, $SF_6$, or $F_2$.

Another technique that may be employed to produce the electrode active material is a process in which one or more precursors or reactants are contacted in solid phase, also referred to as "solid phase synthesis." Examples include hot pressing, cold pressing, isostatic pressing, sintering, calcining, spark plasma sintering, flame pyrolysis, combustion synthesis, plasma synthesis, atomization, and melt spinning. Some solid phase syntheses involve grinding and mixing of bulk precursor materials such as those identified for vapor transport deposition, flash evaporation or the solvent process. The bulk materials are ground to very small dimensions and then combined or otherwise mixed and reacted as necessary to form the desired composition. Milling may be performed via jet milling, cryo milling, planetary milling (Netzsch, Fritsch), high energy milling (Spex), and other milling techniques known to those skilled in the art. In some embodiments, the ground and mixed particles are calcined. In certain embodiments, the grinding apparatus produces particles on the order of about 20 nm.

In certain embodiments, particles of the active material along with particles of any other cathode components (e.g., ion conductor, electron conductor, and/or MEIC) are coated on a current collecting substrate. In certain embodiments, the particles have dimensions as set forth elsewhere herein. The particles may be coated on the current collector with using a dry or wet process. In either case, a binder may be employed to hold the particles together in an active layer adhering to the substrate. Slurry coating is one example of a wet process. Typically, slurry coating puts down a layer that is only about 30% dense in active material. After densification process, that density can increase to about 70%-80%. Densification/deformation is commonly performed between calendar rollers at a fixed gap or with a fixed pressure; it can be done at elevated temperature.

EXPERIMENTAL

The following data demonstrate the high performance of iron sulfur fluorine compounds described herein. The data further demonstrate that the performance is maintained at high rates. The rate behavior is illustrated by high ratios of capacity and other electrochemical properties for discharge at 100 C and 10 C. A ratio close to a value of 1 indicates that the electrochemical property does not significantly suffer when the discharge rate is increased tenfold from 10 C to 100 C. In addition to the specific capacity, other electrochemical properties that exhibit relatively high ratios when measured at 100 C discharge are average discharge voltage, average hysteresis, specific energy, and energy efficiency.

FIGS. 6A-6J are ternary phase diagrams that illustrate the values of electrochemical parameters for each of four different compositions, each containing a relatively high proportion of sulfur. In some cases, the parameter values are simple magnitudes and in other cases, the parameter values are provided as ratios of a parameter at two different discharge rates: 10 C and 100 C.

Figure 6A:
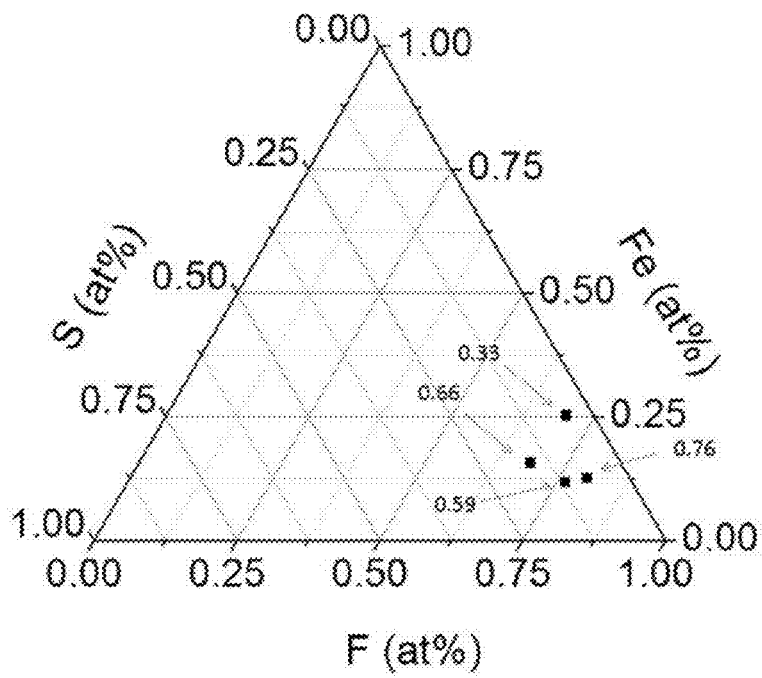

FIG. 6A shows ratios of specific capacities measured between 1-4V vs. Li and at 120° C. with charge/discharge rates of 100 C and 10 C for each of four different iron sulfur fluoride compounds. The capacity ratios are 0.33, 0.59, 0.66, and 0.76. A higher ratio reflects the higher conductivity of the material in that it is able to sustain higher charge rates. The specific capacity is measured in mAh/g of the cathode material.

Figure 6B:
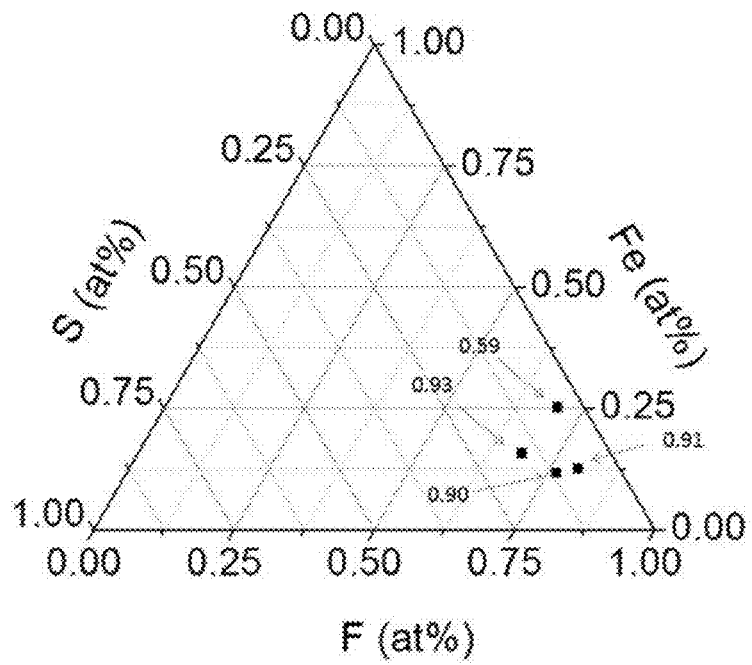

FIG. 6B shows ratios of average discharge voltage measured between 4-1V vs. Li and 120° C. at charge/discharge rates of 100 C and 10 C for each of four different iron sulfur fluoride compounds. The ratios are quite good: 0.59, 0.90, 0.91, and 0.93. The average discharge voltage is an average of the measured discharge voltage over the entire course of discharge from a fully charged state to a fully discharged state. A higher ratio reflects the ability of the material to sustain a higher charge and discharge rate.

Figure 6C:
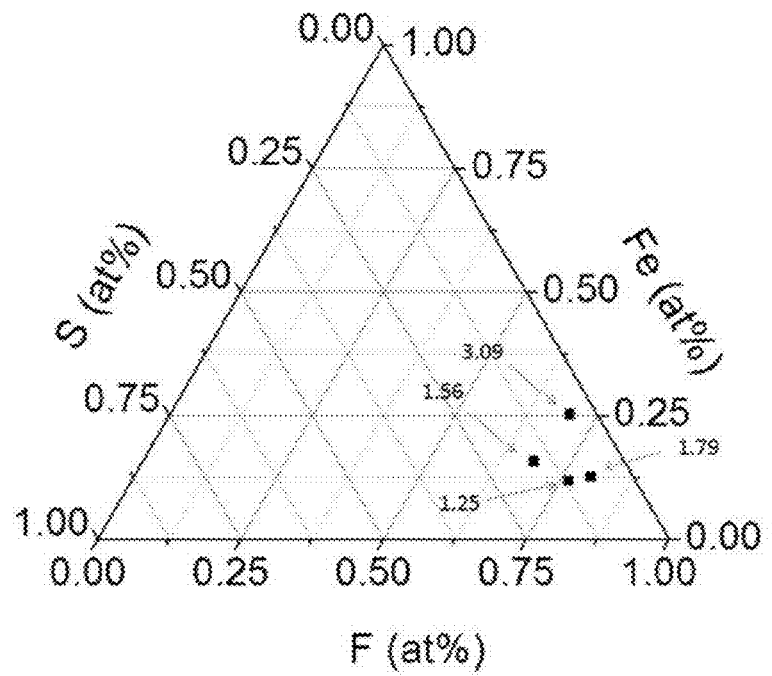
Figure 6D:
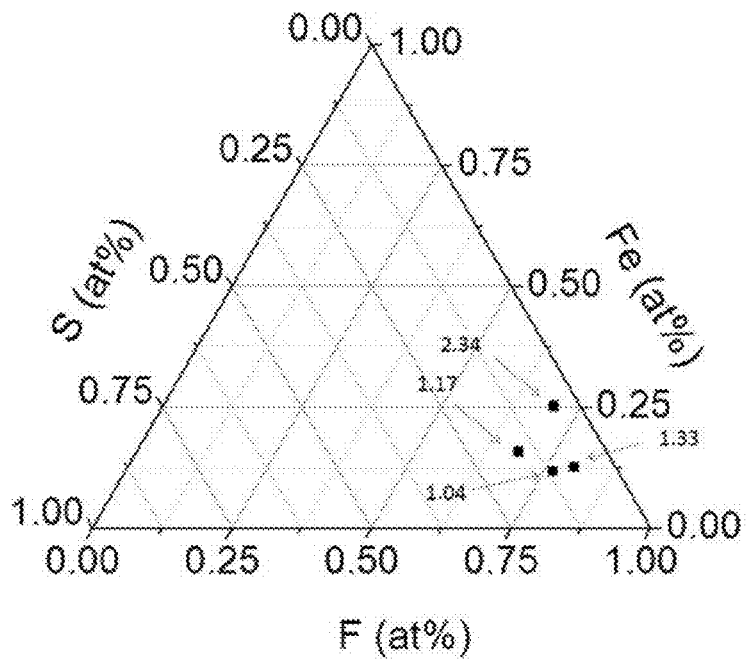
Figure 6E:
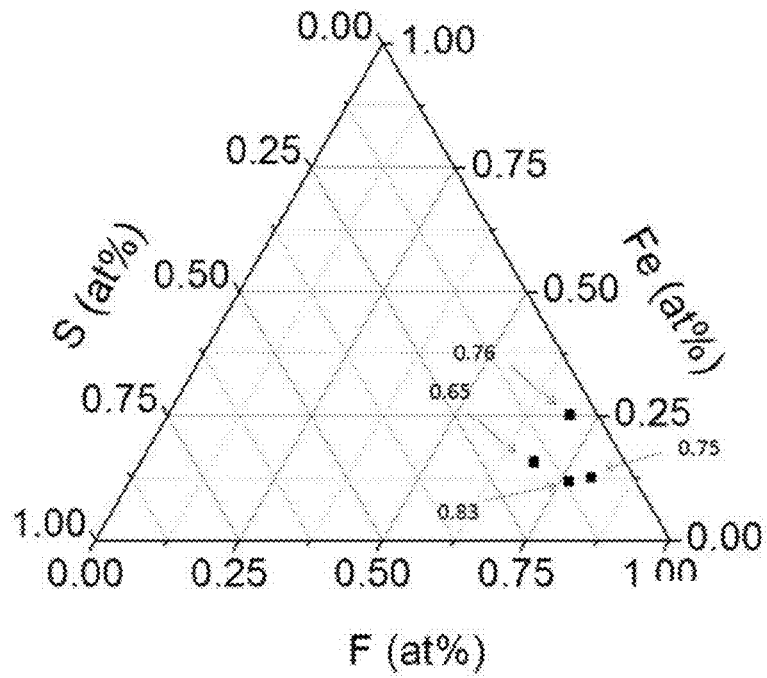

FIG. 6C shows ratios of average hysteresis measured at 120° C. between 4-1V vs. Li and charge/discharge rates of 100 C and 10 C for each of four different iron sulfur fluoride compounds. The ratios are 3.09, 1.79, 1.56, and 1.25. Hysteresis is a measure of the difference between the charge and discharge voltage at any given state of charge. The average hysteresis is an average of all hysteresis values measured over the full range of charge. Because higher values of hysteresis indicate a poor performance, associated with high over potentials, the ratio of the average hysteresis taken at 100 C to 10 C is preferably a relatively low number.

It is worth noting that the hysteresis values measured independently at 10 C and 100 C are relatively low in comparison to those of ferric fluoride. For example, the discharge rate of C/10, ferric fluoride has an average hysteresis of about 1V. The iron sulfur fluorine compositions, by contrast, have a hysteresis value below one volt, and typically significantly below one, even when discharged at a much higher rate of 10 C. See FIGS. 6D and 6E.

Figure 6F:
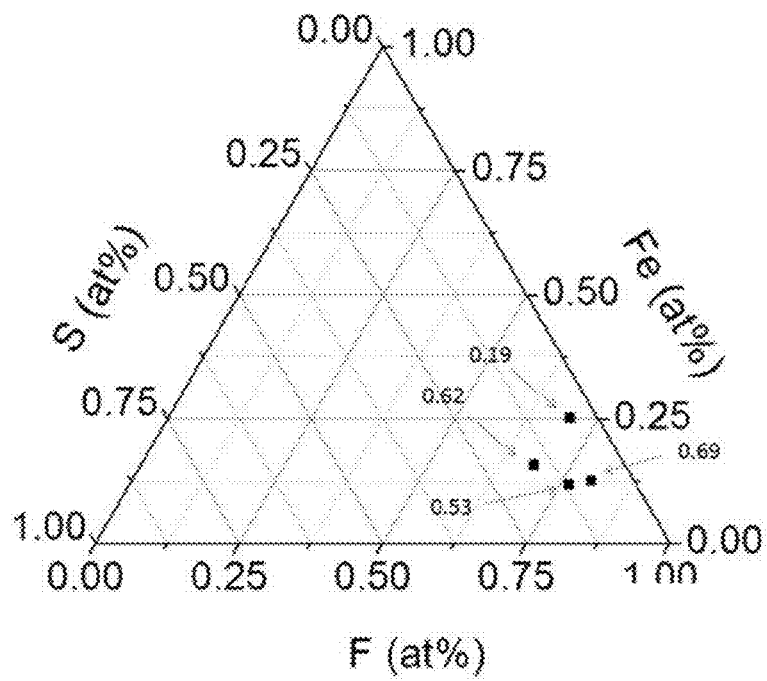

FIG. 6F shows ratios of electrode specific energy measured at 120° C. and 4-1V vs Li at charge/discharge 100 C and 10 C for each of four different iron sulfur fluoride compounds. The ratios are 0.19, 0.53, 0.62, and 0.69. A high ratio reflects the ability of the material to sustain high charge/discharge rates. The specific energy values in this figure are measured in Wh/kg of active material.

Figure 6G:
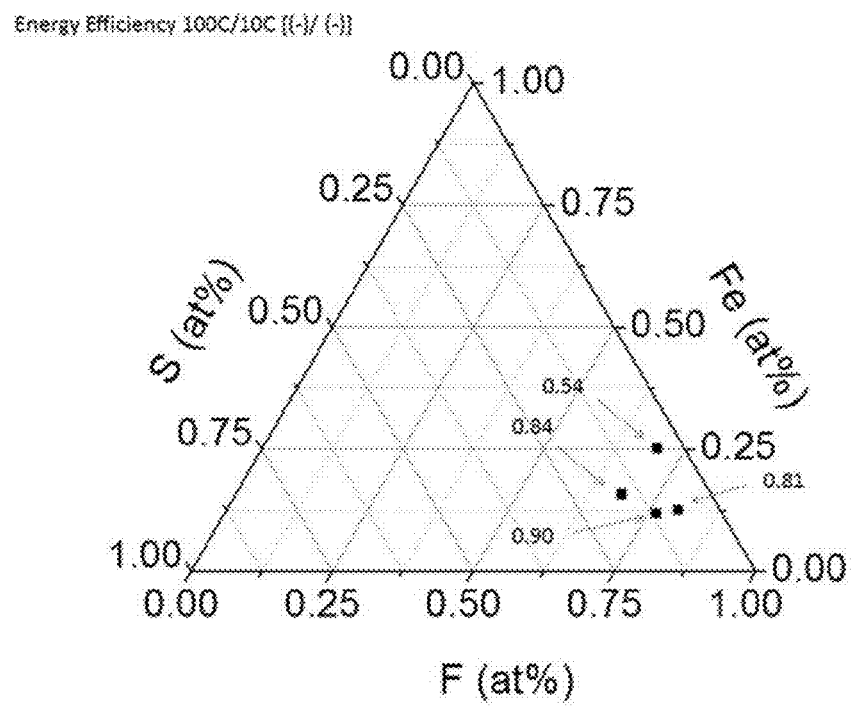
Figure 6H:
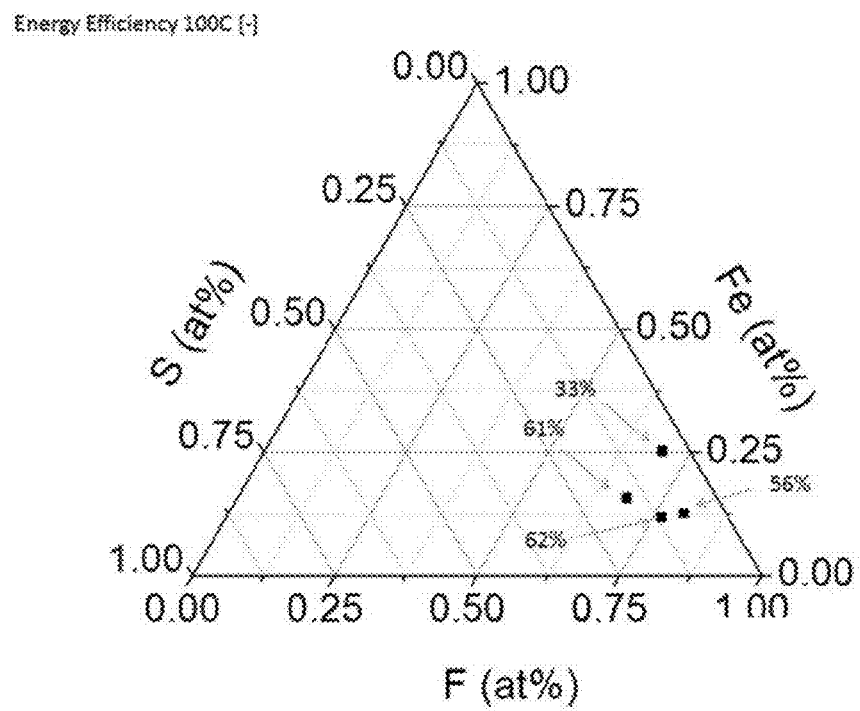
Figure 6I:
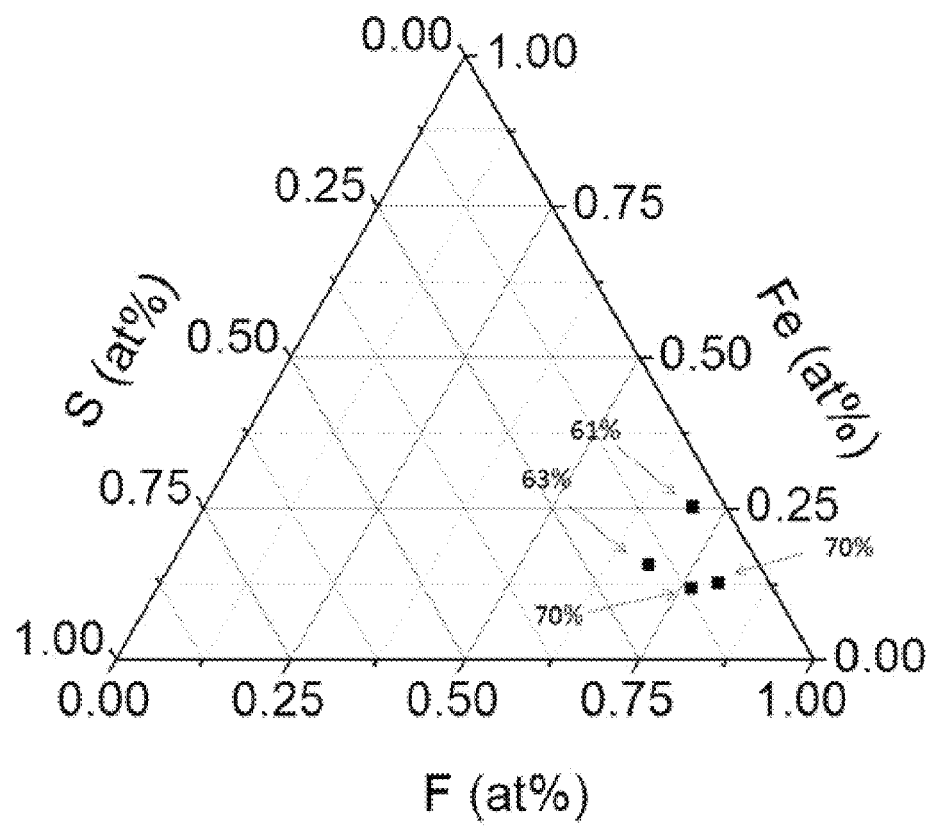

FIG. 6G shows ratios of electrode energy efficiency measured at 120° C. and 4-1V vs Li with charge/discharge rates of 100 C and 10 C for each of four different iron sulfur fluoride compounds. The ratios are 0.54, 0.81, 0.84, and 0.90. As explained above, energy efficiency represents the energy generated during discharge divided by the energy consumed during charge. The actual values of energy efficiency measured at 10 C and 100 C are shown in FIGS. 6H and 6I.

FIG. 6J shows the cathode energy density for 5 different iron sulfur fluoride compounds and an iron fluoride. The energy density is measured as energy per volume of cathode active material in the discharged state. The electrode with the lowest energy density is the iron fluoride electrode; i.e., the electrode employing a compound without any sulfur. As shown, points 601 and 606 each have a cathode energy density of approximately 3.08 kWh/L. Point 602 has a cathode energy density of approximately 2.68 kWh/L, while point 603 has a cathode energy density of approximately 2.48 kWh/L. Point 604 has a cathode energy density of approximately 2.91 kW/L and point 605 has a cathode energy density of approximately 2.36 kWh/L.

Figure 7:
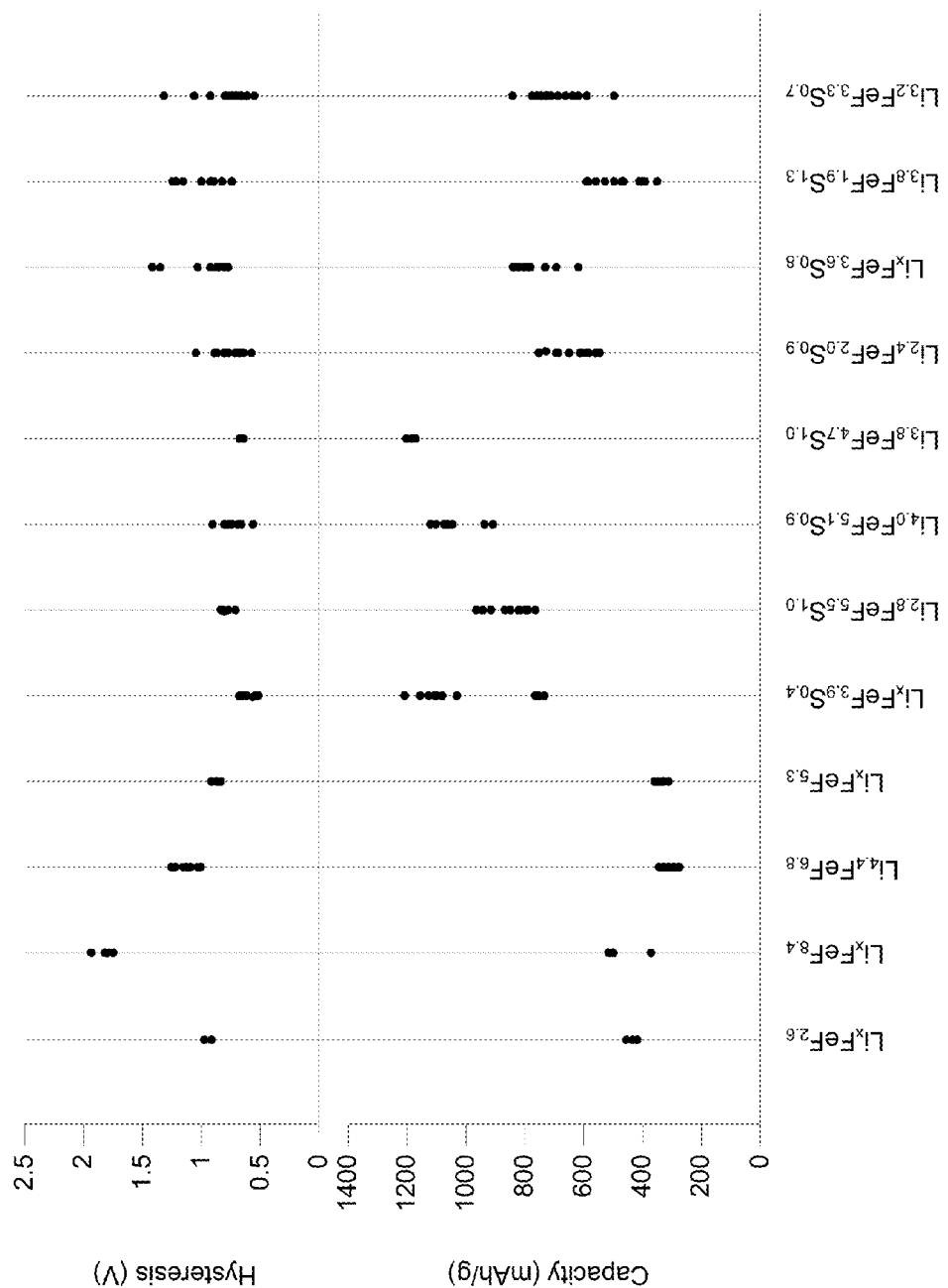
FIG. 7 is a plot comparing the hysteresis and capacity of various active materials in accordance with various embodiments.

FIG. 7 compares various active materials, some containing only iron and fluorine and others containing iron, sulfur, and fluorine. The comparisons are made on the basis of hysteresis and specific capacity data. As can be seen, the compositions containing sulfur generally outperform (lower hysteresis, higher capacity) the compositions containing only iron and fluorine.

Figure 8A:
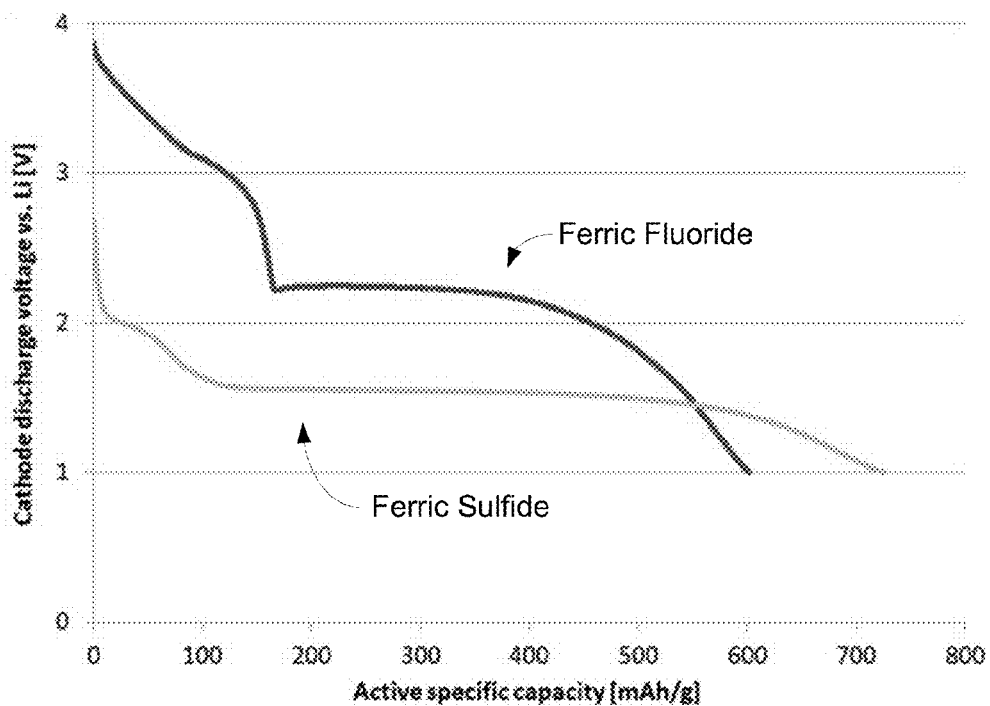
FIGS. 8A and 8B are plots depicting voltage and capacity of various compounds in accordance with disclosed embodiments.

FIG. 8A shows voltage versus capacity discharge curves for ferric fluoride (upper curve) and ferric sulfide (lower curve). If one assumes that a hybrid electrode composed of ferric fluoride and ferric sulfide is equivalent to two electrodes—one composed entirely of ferric fluoride and other composed entirely of ferric sulfide—electrically connected in parallel, the calculated discharge curve would appear as the dashed curve in FIG. 8B. However, the performance of iron sulfur fluoride compounds has been found to far exceed the calculated performance of a mixture of ferric fluoride and ferric sulfide. The electrode voltage remains significantly greater than that calculated for the hybrid electrode over the first 400 mAh/g of discharge. See the upper curve in FIG. 8B. The specific energy is significantly greater for the iron sulfur fluoride compounds (1500 Wh/kg) than that of ferric fluoride (1400 Wh/kg) or of the hypothetical hybrid sulfide-fluoride electrode (1250 Wh/kg).

Figure 8B:
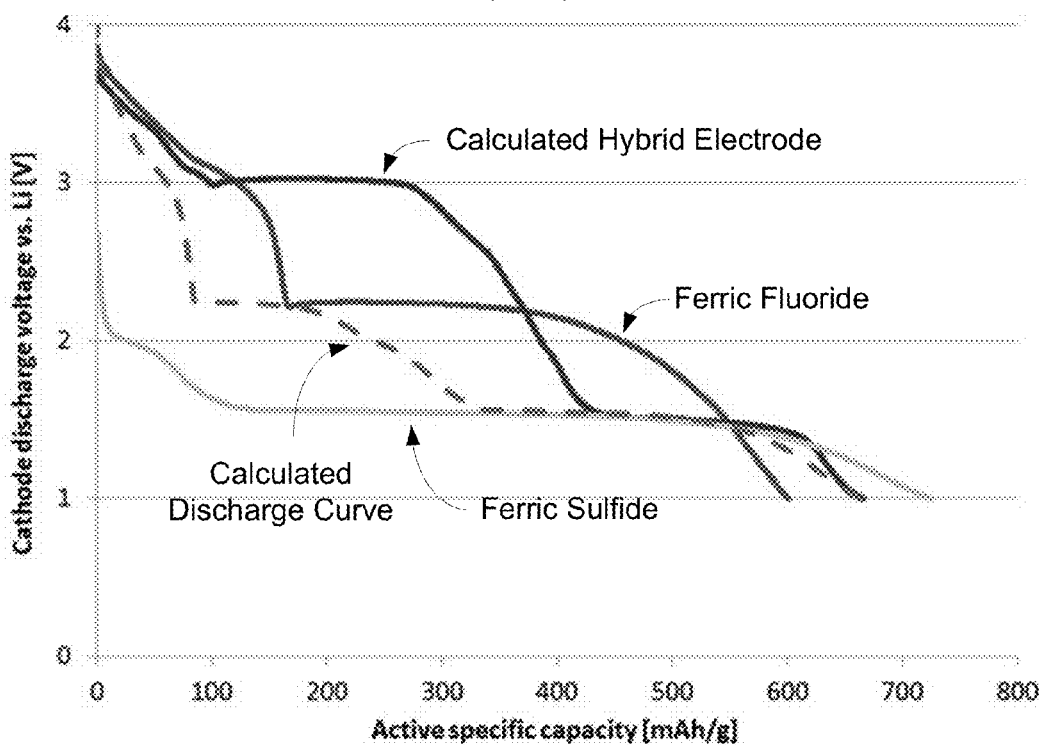

The top curve in FIG. 8B (the F/S compound) represents a compound in the range of $Li_xFeF_{3.6}S_{0.8}$—$Li_{3.2}FeF_{3.3}S_{0.7}$.

| Cathode | Wh/kg | Thick (nm) |
|---|---|---|
| Baseline FeF$_3$ | 1400 | 50 |
| Additive FeS$_X$ (bottom) | 1100 | 300 |
| Calc. comb. (dashed) | 1250 | <100 |
| Meas. comb. (top) | 1500 | 300 |

Figure 9A:
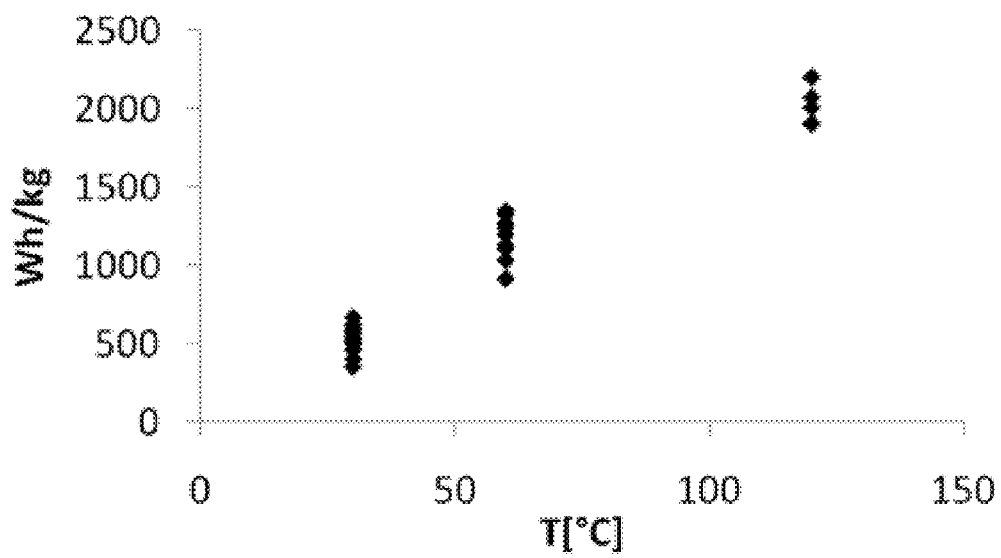
FIGS. 9A and 9B are correlation plots of experimental results using disclosed embodiments.
Figure 9B:
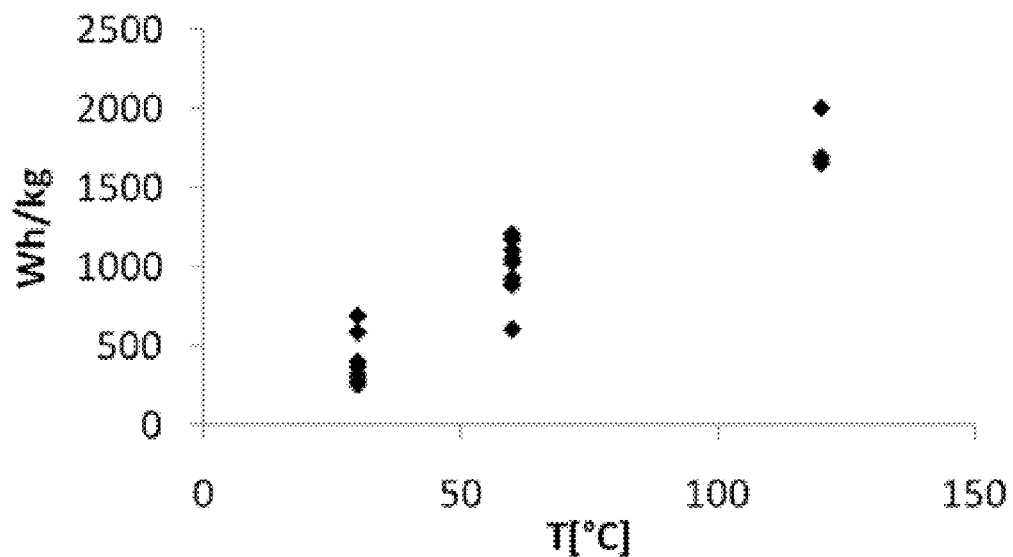

While much of the data and description presented herein is for cathodes and devices incorporating such electrodes operating above room temperature (e.g., 120° C.), the information provided herein can normally be scaled based for other temperatures. It has been found, for example, that strong correlations exist between charge/discharge rate, temperature and particle size. For a given rate and particle size, examples of the correlation are shown in FIGS. 9A and 9B.

OTHER EMBODIMENTS

It is to be understood that the compositions, methods and designs described herein are exemplary, and should not be considered limiting because numerous variations are possible within the disclosed inventive framework. The specific compositions, electrodes, and methods described herein represent only a fraction of those contemplated.

The invention claimed is:

1. A cathode for a battery, comprising:
   (i) particles of $FeF_aS_bO_c$; and
   (ii) particles of a combination of iron metal, and lithium fluoride, lithium oxide, and/or lithium sulfide,
   wherein the atomic ratio of the iron to fluorine, sulfur, and oxygen in (i) and (ii) is 1:a:b:c, and
   wherein $1 \leq a \leq 9$, $0 < b \leq 3$, and $0 \leq c \leq 2$;
   wherein the particles have a median characteristic dimension of between about 10 nm and 10000 nm; wherein the particles are approximately spherical.

2. The cathode of claim 1, wherein $1 \leq a \leq 5$, $0 < b \leq 2$, and $0 \leq c \leq 1.5$.

3. The cathode of claim 1, wherein the compound of the formula $FeF_aS_bO_c$ has a discharge capacity of at least about 400 mAh/g when discharged from 4.5 volts versus a lithium metal electrode to 1 volt versus the lithium metal electrode, and when discharged at a rate of at least 100 mA/g and at a temperature of 40-120° C.

4. The cathode of claim 1, wherein the compound of the formula $FeF_aS_bO_c$ has an average discharge voltage of at least about 2 volts when discharged from 4.5 volts versus a lithium metal electrode to 1 volt versus the lithium metal electrode, and when discharged at a rate of at least 100 mA/g and at a temperature of 40-120° C.

5. The cathode of claim 1, wherein the compound of the formula $FeF_aS_bO_c$ has an average hysteresis of at most about 2 volts when discharged from 4.5 volts versus a lithium metal electrode to 1 volt versus the lithium metal electrode, and when discharged at a rate of at least 100 mA/g and at a temperature of 40-120° C.

6. The cathode of claim 1, wherein the electrochemically active material or combination of electrochemically active materials has a specific capacity of at least about 300 mAh/g above a voltage of at least about 2.5 volts relative to lithium, when charged to a voltage of 3.9 volts relative to lithium and discharged at a rate of at least 100 mA/g and at a temperature of 40-120° C.

7. The cathode of claim 1, wherein the electrochemically active material or combination of electrochemically active materials has a specific capacity of at least about 500 mAh/g above a voltage of at least about 1 volt relative to lithium, when charged to a voltage of 3.9 volts relative to lithium and discharged at a rate of at least 100 mA/g and at a temperature of 40-120° C.

8. The cathode of claim 1, wherein the electrochemically active material or combination of electrochemically active materials has a specific energy of at least about 600 mWh/g above a voltage of at least about 2.9 volts relative to lithium, when charged to a voltage of 3.9 volts relative to lithium and discharged at a rate of at least 100 mA/g and at a temperature of 40-120° C.

9. The cathode of claim 1, wherein the electrochemically active material or combination of electrochemically active materials has a specific energy of at least about 1000 mWh/g above a voltage of at least about 1 volt relative to lithium, when charged to a voltage of 3.9 volts relative to lithium and discharged at a rate of at least 100 mA/g and at a temperature of 40-120° C.

10. The cathode of claim 1, further comprising a current collector in electrical communication with the material or combination of materials.

11. The cathode of claim 10, wherein the current collector comprises copper, a copper alloy, nickel, steel, stainless steel, aluminum, carbon-coated aluminum or an aluminum alloy.

12. An energy storage device comprising:
    an anode;
    an electrolyte; and
    a cathode of claim 1.

13. The device of claim 12, wherein the device has a specific energy of at least about 200 Wh/kg when measured at 60° C. and a current of at least 100 mA/g of active cathode material.

14. The device of claim 12, wherein the anode, electrolyte, and cathode, together comprise a stack of about 1 μm to 500 μm thickness.

* * * * *